United States Patent
Dasgupta et al.

(10) Patent No.: US 12,395,550 B2
(45) Date of Patent: Aug. 19, 2025

(54) MULTI-ACCESS EDGE COMPUTING BASED VISIBILITY NETWORK

(71) Applicant: Extreme Networks, Inc., San Jose, CA (US)

(72) Inventors: Shubharanjan Dasgupta, Bangalore (IN); Mythil Raman, San Jose, CA (US); Prasanna Kumar Acharya, Bangalore (IN); Ram Gopal Singh, Bangalore (IN); Pranesh Kulkarni, Bangalore (IN)

(73) Assignee: Extreme Networks, Inc., San Jose, CA (US)

( * ) Notice: Subject to any disclaimer, the term of this patent is extended or adjusted under 35 U.S.C. 154(b) by 0 days.

(21) Appl. No.: 18/513,974

(22) Filed: Nov. 20, 2023

(65) Prior Publication Data

US 2024/0089173 A1    Mar. 14, 2024

Related U.S. Application Data

(63) Continuation of application No. 16/798,210, filed on Feb. 21, 2020, now Pat. No. 11,870,649.

(Continued)

(51) Int. Cl.
*H04L 47/10* (2022.01)
*H04L 9/06* (2006.01)
(Continued)

(52) U.S. Cl.
CPC ............ *H04L 67/10* (2013.01); *H04L 9/0643* (2013.01); *H04L 41/0823* (2013.01);
(Continued)

(58) Field of Classification Search
CPC ............... H04L 41/0823; H04L 9/0643; H04L 43/0888; H04L 45/745; H04L 47/24;
(Continued)

(56) References Cited

U.S. PATENT DOCUMENTS

| | | |
|---|---|---|
| 9,930,012 B1 | 3/2018 | Clemons, Jr. et al. |
| 11,323,324 B2 | 5/2022 | Dasgupta et al. |

(Continued)

OTHER PUBLICATIONS

International Search Report and Written Opinion of the International Searching Authority directed to related International Patent Application No. PCT/US2020/019318, mailed Jun. 12, 2020; 14 pages.

(Continued)

*Primary Examiner* — Anh Nguyen
(74) *Attorney, Agent, or Firm* — Sterne, Kessler, Goldstein & Fox P.L.L.C.

(57) ABSTRACT

Disclosed herein are system, method, and computer program product embodiments for providing traffic visibility in a network. An embodiment operates by a third-party component receiving a copy of a first data packet during a first period of time. The third-party component extracts a first network parameter associated with the first period of time from the copy of the first data packet. The third-party component then predicts a baseline of normalcy for the first network parameter during a second period of time after the first period of time based on data associated with a copy of a second data packet and the first network parameter. Thereafter, the third-party component receives a copy of a third data packet during the second period of time, and extracts a second network parameter from the copy of the third data packet. The third-party component then determines that the second network parameter of the copy of the second data packet is an anomaly based on the baseline of normalcy for the first network parameter.

20 Claims, 16 Drawing Sheets

Related U.S. Application Data

(60) Provisional application No. 62/809,231, filed on Feb. 22, 2019.

(51) Int. Cl.
| | |
|---|---|
| *H04L 41/0823* | (2022.01) |
| *H04L 43/0888* | (2022.01) |
| *H04L 45/745* | (2022.01) |
| *H04L 47/24* | (2022.01) |
| *H04L 47/32* | (2022.01) |
| *H04L 47/36* | (2022.01) |
| *H04L 61/5007* | (2022.01) |
| *H04L 67/10* | (2022.01) |
| *H04L 67/289* | (2022.01) |
| *H04L 67/53* | (2022.01) |
| *H04L 9/00* | (2022.01) |

(52) U.S. Cl.
CPC ........ *H04L 43/0888* (2013.01); *H04L 45/745* (2013.01); *H04L 47/24* (2013.01); *H04L 47/32* (2013.01); *H04L 47/36* (2013.01); *H04L 61/5007* (2022.05); *H04L 67/289* (2013.01); *H04L 67/53* (2022.05); *H04L 9/50* (2022.05)

(58) Field of Classification Search
CPC ..... H04L 47/32; H04L 47/36; H04L 61/5007; H04L 67/53; H04L 9/50; H04L 67/535; H04L 41/142; H04L 41/16; H04L 43/062; H04L 63/0227; H04L 63/1408; H04L 69/18; H04L 67/10; H04L 67/289; H04L 69/22
See application file for complete search history.

(56) References Cited

U.S. PATENT DOCUMENTS

| | | |
|---|---|---|
| 11,870,649 B2 | 1/2024 | Dasgupta et al. |
| 2006/0008063 A1 | 1/2006 | Harnesk et al. |
| 2006/0064619 A1 | 3/2006 | Wen et al. |
| 2008/0043976 A1 | 2/2008 | Maximo et al. |
| 2009/0135794 A1 | 5/2009 | Su et al. |
| 2010/0130170 A1 | 5/2010 | Liu et al. |
| 2013/0003607 A1 | 1/2013 | Kini et al. |
| 2013/0250799 A1 | 9/2013 | Ishii |
| 2014/0192776 A1 | 7/2014 | Lee et al. |
| 2015/0071292 A1 | 3/2015 | Tripathi et al. |
| 2015/0120871 A1 | 4/2015 | Li |
| 2015/0244842 A1 | 8/2015 | Laufer et al. |
| 2015/0245277 A1 | 8/2015 | Hassan et al. |
| 2015/0257159 A1 | 9/2015 | Speicher et al. |
| 2015/0358434 A1 | 12/2015 | Parthasarathy et al. |
| 2016/0020993 A1* | 1/2016 | Wu .............. H04L 45/14 370/392 |
| 2016/0294606 A1* | 10/2016 | Puri .............. G06Q 10/06393 |
| 2016/0294776 A1 | 10/2016 | Sun et al. |
| 2017/0132615 A1 | 5/2017 | Castinado et al. |
| 2017/0140408 A1 | 5/2017 | Wuehler |
| 2017/0142021 A1 | 5/2017 | Chen et al. |
| 2017/0163685 A1 | 6/2017 | Schwartz et al. |
| 2018/0053401 A1* | 2/2018 | Martin .............. H04M 11/04 |
| 2018/0152385 A1 | 5/2018 | Xu et al. |
| 2019/0043050 A1 | 2/2019 | Smith et al. |
| 2020/0065212 A1* | 2/2020 | Chanda .............. H04L 41/142 |
| 2020/0090208 A1 | 3/2020 | Reichenbach et al. |
| 2020/0272493 A1 | 8/2020 | Lecuyer et al. |
| 2020/0274765 A1 | 8/2020 | Dasgupta et al. |
| 2021/0221247 A1 | 7/2021 | Daniel et al. |
| 2021/0342836 A1 | 11/2021 | Cella et al. |
| 2021/0400595 A1 | 12/2021 | Sutskover et al. |
| 2022/0263716 A1 | 8/2022 | Dasgupta et al. |

OTHER PUBLICATIONS

International Search Report and Written Opinion of the International Searching Authority directed to related International Patent Application No. PCT/US2020/019315, mailed Jun. 17, 2020, 11 pages.

* cited by examiner

| No. | Time | Source | Destination | Protocol | Length | Info |
|---|---|---|---|---|---|---|
| 402A | 0.000000 | 40.97.124.210 | 134.141.188.98 | TLSv1.2 | 164 | Application Data |
| 402B | 0.000000 | 40.97.124.210 | 134.141.188.98 | TLSv1.2 | 105 | Application Data |
| 402C | 0.000001 | 40.97.124.210 | 134.141.188.98 | TLSv1.2 | 88 | Application Data |
| 402D | 0.000077 | 134.141.188.98 | 40.97.124.210 | TCP | 54 | 54557 → 443 [ACK] Seq=1 Ack=196 Win=254 Len=0 |
| 402E | 0.001772 | 134.141.188.98 | 40.97.124.210 | TCP | 54 | 54557 → 443 [FIN, ACK] Seq=1 Ack=196 Win=254 Len=0 |
| 402F | 0.240510 | 40.97.124.210 | 134.141.188.98 | TCP | 60 | 443 → 54557 [FIN, ACK] Seq=196 Ack=2 Win=65535 Len=0 |
| 402G | 0.240633 | 134.141.188.98 | 40.97.124.210 | TCP | 54 | 54557 → 443 [ACK] Seq=2 Ack=197 Win=254 Len=0 |
| 402H | 0.999386 | 134.141.162.20 | 134.141.188.98 | DNS | 81 | Standard query 0xf9f7 A outlook.office365.com |
| 402I | 1.008482 | 134.141.162.20 | 134.141.188.98 | DNS | 207 | Standard query response 0xf9f7 A outlook.office365.com |

FIG. 4

MULTI-ACCESS EDGE COMPUTING BASED VISIBILITY NETWORK

CROSS-REFERENCE TO RELATED APPLICATION

This application is a continuation of U.S. Non-Provisional application Ser. No. 16/798,210, filed on Feb. 21, 2020, which claims priority from U.S. Provisional Application No. 62/809,231, filed on Feb. 22, 2019, the contents of each is hereby incorporated by reference in their entireties.

BACKGROUND

Network hosts are continually concerned about the experience that users have on their network, in terms of latency and bandwidth efficiency. The user experience can depend on a number of different variables, such as the number of network users and user behavior on the network (e.g., time spent on the network, time of day on the network, and applications used on the network). Given the constant flow of network information provided to users, improving network latency and bandwidth efficiency can be challenging.

SUMMARY

In some embodiments, a method for providing traffic visibility in a network is provided. The method includes maintaining, by a third-party component in communication with a network component, a rule table including a first rule including a first plurality of identifiers and a first action for deriving a first network packet characteristic. The third-party component and the network component are at the edge of the network. The method also includes receiving, by a third-party component, a copy of a first network packet including a second plurality of identifiers from a network component located at the end of the network. The method further includes, in response to the second plurality of identifiers matching the first plurality of identifiers, determining, by a third-party component, a second rule of the rule table that includes a second action for deriving a second network packet characteristic. The method further includes receiving, by a third-party component, a copy of a second network packet including a third plurality of identifiers from the network component. The method further includes, in response to the third plurality of identifiers matching the second plurality of identifiers, identifying, by a third-party component, the second rule of the rule table. The method also includes performing, by a third-party component, the second action of the second rule to derive the second network packet characteristic based on data from the copy of the second network packet.

In some embodiments, a system including a memory and a processor coupled to the memory is provided. The processor is configured to maintain, by a third-party component in communication with a network component, a rule table including a first rule with a first plurality of identifiers and a first action for deriving a first network packet characteristic. The third-party component and the network component are at the edge of the network. The processor is also configured to receive, by the third-party component from the network component, a copy of a first network packet including a second plurality of identifiers from a network component located at the edge of the network. The processor is further configured to, in response to the second plurality of identifiers matching the first plurality of identifiers, determine, by the third-party component, a second rule of the rule table that includes a second action for deriving a second network packet characteristic. The processor is further configured to receive, by the third-party component, a copy of a second network packet including a third plurality of identifiers from the network component. The processor is also configured to, in response to the third plurality of identifiers matching the second plurality of identifiers, identify, by the third-party component, the second rule of the rule table. The processor is further configured to perform, by the third-party component, the second action of the second rule to derive the second network packet characteristic based on data from the copy of the second network packet.

In some embodiments, a non-transitory computer-readable device having instruction stored thereon is provided. The instructions, when executed by a computing device, cause the computing device to perform operations, including maintaining, by a third-party component in communication with a network component, a rule table including a first rule with a first plurality of identifiers and a first action for deriving a first network packet characteristic. The third-party component and the network component are at the edge of the network. The operations also include receiving, by the third-party component from the network component, a copy of a first network packet including a second plurality of identifiers from a network component located at the edge of the network. The operations further include, in response to the second plurality of identifiers matching the first plurality of identifiers, determining, by the third-party component, a second rule of the rule table that includes a second action for deriving a second network packet characteristic. The operations further include receiving, by the third-party component, a copy of a second network packet including a third plurality of identifiers from the network component. The operations further include, in response to the third plurality of identifiers matching the second plurality of identifiers, identifying, by the third-party component, the second rule of the rule table. The operations also include performing, by the third-party component, the second action of the second rule to derive the second network packet characteristic based on data from the copy of the second network packet.

In some embodiments, each of the first, second, and third pluralities of identifiers includes a source IP address and a destination IP address. In some embodiments, each of the first, second, and third pluralities of identifiers further includes one or more of a protocol identification number, a source port number, and a destination port number. In some embodiments, the rule table includes a third rule with a source IP address, a destination IP address, and a third action for deriving a third network characteristic. In some embodiments, the third-party component determines that the source IP address or the destination IP address of the first network packet is different from the source IP address or the destination IP address of the first and second rules. In response to the source IP address and the destination IP address of the copy of the second network packet matching the source IP address and the destination IP address of the third rule, the third-party component identifies the third rule of the rule table and determines that the second rule has a priority over the third rule. In some embodiments, the rule table includes a default rule with a third action for deriving a third network characteristic. The third-party component receives a copy of a third network packet including a source IP address and a destination IP address. In response to the source IP address and/or the destination IP address of the copy of the third network packet being different from the source IP address and/or the destination IP address of the first and second rules, the third-party component identifies the default rule of the rule table and performs the third action to derive the third network packet characteristic based on the data of the copy of the second network packet.

In some embodiments, the third-party component's determination of the second rule includes creating the second rule to include the source IP address and the destination IP address of the copy of the first network packet such that the source IP address and the destination IP address of the second rule matches the source IP address and the destination IP address of the copy of the first network packet. In some embodiments, the third-party component receives the second action for the second rule after creating the first rule. In some embodiments, each of the first and second actions includes one of determining a first type of metadata, determining a second type of metadata, determining a running application, determining a throughput of the network, determining a quality of the network, determining a quality of service, dropping of the second network packet, and forwarding the second network packet to a configured port.

In some embodiments, the third-party component receives at least one of the first rule and the second rule from a network provider. In some embodiments, each of the first and second network packet characteristics includes one or more of a user device identifier, a degree of network throughput, and a degree of network quality. In some embodiments, the first network packet characteristic is different from the second network packet characteristic. In some embodiments, the first network packet characteristic is the same as the second network packet characteristic. In some embodiments, the data from the copy of the second network packet includes one or more of a number of packets, an application, a bandwidth, and a type of transmitted information.

In some embodiments, a method for determining an anomaly during a specified period of time is provided. The method includes receiving, by a third-party component from a network component, a copy of a first data packet during a first period of time. The third-party component and the network component are located at an edge of a network. The method also includes extracting, by the third-party component, a first network parameter associated with the first period of time from the copy of the first data packet. The method further includes predicting, by the third-party component, a baseline of normalcy for the first network parameter during a second period of time after the first period of time based on data associated with a copy of a second data packet and the network parameter of the first data packet. The copy of the second data packet is provided by the network component to the third-party component. The method also includes receiving, by the third-party component from the network component, a copy of a third data packet during the second period of time and extracting, by the third-party component, a second network parameter from the copy of the third data packet. The method further includes determining, by the third-party component, that the second network parameter of the copy of the third data packet is an anomaly based on the baseline of normalcy for the first network parameter.

In some embodiments, a system including a memory and a processor coupled to the memory is provided. The processor is configured to receive, by a third-party component from a network component, a copy of a first data packet during a first period of time. The third-party component and the network component are located at an edge of a network. The processor is also configured to extract, by the third-party component, a first network parameter associated with the first period of time from the copy of the first data packet. The processor is further configured to predict, by the third-party component, a baseline of normalcy for the first network parameter during a second period of time after the first period of time based on data associated with a copy of a second data packet and the network parameter of the first data packet. The copy of the second data packet is provided by the network component to the third-party component. The processor is further configured to receive, by the third-party component from the network component, a copy of a third data packet during the second period of time and extract, by the third-party component, a second network parameter from the copy of the third data packet. The processor is further configured to determine, by the third-party component, that the second network parameter of the copy of the third data packet is an anomaly based on the baseline of normalcy for the first network parameter.

In some embodiments, a non-transitory computer-readable device having instruction stored thereon is provided. The instructions, when executed by a computing device, cause the computing device to perform operations, including receiving, by a third-party component from a network component, a copy of a first data packet during a first period of time. The third-party component and the network component are located at an edge of a network. The operations also include extracting, by the third-party component, a first network parameter associated with the first period of time from the copy of the first data packet. The operations further include predicting, by the third-party component, a baseline of normalcy for the first network parameter during a second period of time after the first period of time based on data associated with a copy of a second data packet and the network parameter of the first data packet. The copy of the second data packet is provided by the network component to the third-party component. The operations also include receiving, by the third-party component from the network component, a copy of a third data packet during the second period of time and extracting, by the third-party component, a second network parameter from the copy of the third data packet. The operations also include determining, by the third-party component, that the second network parameter of the copy of the third data packet is an anomaly based on the baseline of normalcy for the first network parameter.

In some embodiments, the first network parameter and the second network parameter are associated with one or more of a user device operation, a user device application usage, a user device location behavior, and a network-entity behavior pattern. In some embodiments, the third-party component derives a network characteristic associated with the first period of time based on the copy of the first data packet and the copy of the second data packet. The baseline of normalcy for the first network parameter is then further based on the network characteristic.

In some embodiments, the network characteristic includes an amount of throughput, a direction of flow, a bandwidth utilization, a latency, or a utilized network service. In some embodiments, the third-party component maintains network provider input relating to the first network parameter. The baseline of normalcy for the first network parameter is further based on the network provider input. In some embodiments, the network provider input is unique to a user. In some embodiments, the network provider input includes a key performance indicator relating to the first network parameter.

In some embodiments, the second period of time includes a first point in time and a second point in time, and the baseline of normalcy for the first point in time is different than the baseline of normalcy for the second point in time.

In some embodiments, the baseline of normalcy includes an expected behavior by the network component. In some embodiments, the third-party component updates the baseline of normalcy for the first network parameter based on the anomaly. In some embodiments, the third-party component determines that the second network parameter of the copy of the second data packet is the anomaly when determining that the anomaly exceeds the baseline of normalcy by a predetermined amount set by a network provider.

BRIEF DESCRIPTION OF THE DRAWINGS

The accompanying drawings are incorporated herein and form a part of the specification.

FIG. 4 illustrates a sequence of packets received by a third-party component, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing network providers visibility to traffic in a network.

The present disclosure is directed to a third-party component in communication with a network component that communicates with user devices in a network (e.g., a 5G network), where the third-party component and network component are located at and/or near an edge of the network. The third-party component can receive copies of data packets from the network component and then extract data relating to user data characteristics (e.g., flows, radio interface, radio unit, and location) therefrom.

In some embodiments, based on the extracted data, the third-party component can identify a traffic flow and a related traffic flow rule. Thereafter, the third-party component can perform a deep packet inspection of the copied data packets based on the traffic flow rule. The deep packet inspection can derive metadata unique to the copied user data. The third-party derived metadata is provided to an external source (e.g., network providers, third parties, and computer analytical tools/engines) for performing a network action (e.g., prevent network interruptions, improve network bandwidth/latency, etc.).

Figure 1:
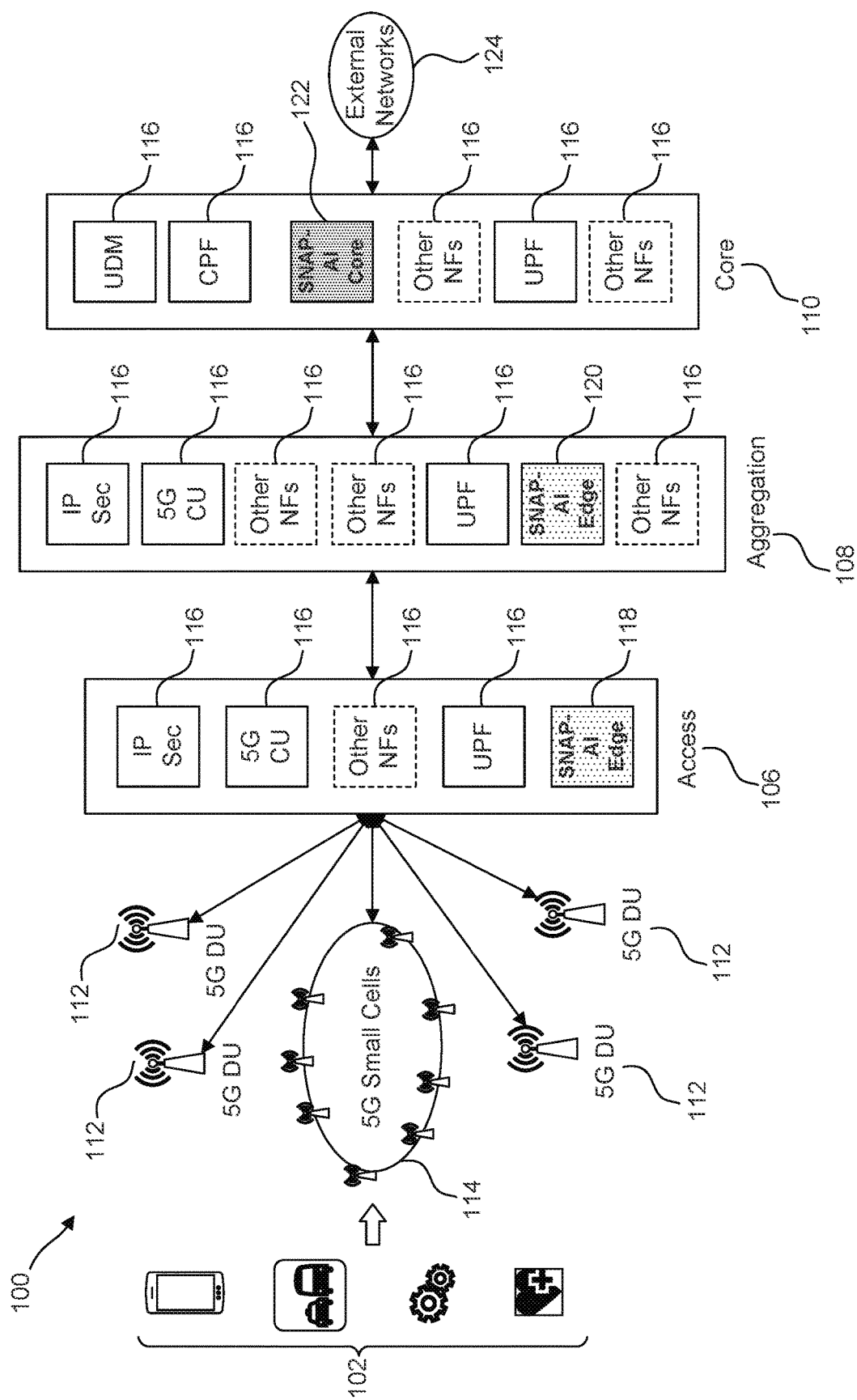
FIG. 1 illustrates a system for providing network access to one or more devices, according to some embodiments.

FIG. 1. illustrates an example system 100 for providing data communication to user devices 102. The system 100 can be managed by internee service providers (ISPs) and receive network access from network service providers (NSPs). ISPs can be any type of business or organization that provides services for accessing, using, or participating in the Internet. NSPs can be any business or organization that sells bandwidth or network access by the Internet backbone to ISPs. The system 100 can provide various types of networks/telecommunications. For example, the system 100 can provide a 5G network.

The system 100 can include one or more access layers 106 and optionally one or more aggregation layers 108 and a core layer 110. The access layers 106 can be in communication with a central unit ("5G CU") (not illustrated), distributed units 112 ("5G DU"), and/or small cells 114 ("5G Small Cells"). A person of ordinary skill in the art would readily understand that the central unit includes gnB functions (e.g., transfer of user data, Mobility control, radio access network sharing, and positioning, session management) and controls the distributed units 112. Distributed units 112 includes a subset of the gNB functions depending on the functional split between the central unit and distributed units 112. Small units 116 are radio access points with low radio frequency and low range and are small, unobtrusive, and easy to be deployed near user devices 102.

As will be discussed in more detail below, the access layers 106 can provide communication to the distributed units 112 and/or small cells 114 at or near access layers 106's edge. Moreover, although not illustrated, where the aggregation layer 108 and the core layer 110 are not utilized, the access layers 106 can be in communication with external network components 116 to provide communication to the distributed units 112 and/or small cells 114. The distributed units 112 and/or small cells 114 can be in communication with user devices 102. The user devices 102 can be any type of computing device able to communicate with the distribution units 112 or the small cells 114. As illustrated, the user devices 102 can include a portable communication device. The user devices 102 can be associated with a user and can be located on and/or a part of a vehicle and/or a company (e.g., a hospital).

The number of access layers 106 utilized can depend on the size of the environment or setting. For example, in small deployments (e.g., a workplace) or medium deployments (e.g., a university), a single access layer 106 can be utilized. However, in large deployments (e.g., a city), multiple access layers 106 can be utilized for different geographical regions. In such a scenario, each access layer 106 can be in communication with each other. This can allow the system 100 to more effectively serve the user devices 102, such as with improved latency and more efficient bandwidth utilization.

The aggregation layers 108 can be utilized when access layers 106 are deployed in different geographical regions (e.g., cities, states, and/or local/national regions). A single aggregation layer 108 can support multiple access layers 106, Thus, a single aggregation layer 108 can be in communication with multiple access layers 106 at the same or different times. Even further, multiple aggregation layers 108 can each be in communication with multiple access layers at the same or different times. In doing so, the aggregation layers 108 can provide and/or receive services to the access layers 106 at or near access layers 106's edge, as will be discussed in more detail below. The aggregation layer 108 can be utilized in a large-scale setting (e.g., a city), not in a medium-scale setting (e.g., a university) or a small-scale setting (e.g., a building), according to some embodiments.

When the aggregation layer 108 is utilized, the aggregation layer 108 can be between, and in communication with, the access layer 106 and the core layer 110. In this configuration, the access layer 106 and the core layer 110 are not in communication with each other, according to some embodiments. Alternatively, when the core layer 110 is not utilized, the access layer 106 can be in communication with the external network 124. When the aggregation layer 108 is not utilized, the access layer 106 can be in communication with the core layer 110, which can then be in communication with external network 124, according to some embodiments. In some embodiments, external network 124 is a digital telecom network operator.

Moreover, the core layer 110 can be utilized depending on the preference of the ISPs. For instance, where multiple access layers 106 and/or aggregation layers 108 are deployed, the core layer 110 can also be deployed. Alternatively, when a single access layer 106 and/or aggregation layer 108 is deployed, the core layer 110 can still be deployed. Accordingly, when the core layer 110 is deployed, the core layer 110 can be in communication with each aggregation layer 108. Thus, the core layer 110 can serve as a central location for communicating with the aggregation layers 108. In doing so, as mentioned above, the core layer 110 can be in communication with the external network 124.

The access layers 106, the aggregation layers 108, and the core layer 110 can each have network components 116 with defined functions. For example, the network components 116 can have an internee protocol security function ("IP Sec"), a central computing function for the network ("5G CU"), a unified power format ("UPF"), a user data management function ("UDM"), and a common power format ("CPF"), any other network function ("other Nfs") functions, or a combination thereof. Moreover, although not illustrated, network components 116 can be situated outside of the access layers 106, the aggregation layers 108, and the core layer 108. For example, although not illustrated, network components can include the distribution units 112 and/or small cells 114. Likewise, network components 116 can also include routers (not shown) and/or other devices assisting the network.

The access layers 106 and aggregation layers 108 can have one or more network components 116 at or near its edge ("edge network components") for providing telecommunication. Accordingly, since the aggregation layers 108 can each support multiple access layers 106 as discussed above, the edge network components of the aggregation layers 108 can provide telecommunication to the edge network components of the access layers 106. Moreover, the edge network components of the access layers 106 and/or aggregation layers 108 can be able to perform multi-access edge computing (MEC). MEC enables cloud computing at an edge of a network by running applications and performing related processing tasks closer to users of the network, thereby reducing network congestion and allowing user applications to perform more efficiently.

Further, the access layers 106 and the aggregation layers 108 can have multiple edge network components (e.g., capable of performing MEC) depending on a number of user devices 102, a type of application run by user devices 102, a location of user devices 102, a bandwidth utilization of user devices 102, and/or a latency experienced by the user devices 102, to provide a few examples. The access layers 106 and aggregation layers 108 can have edge network components designated for certain activities of user devices 102. For example, if a number of user devices 102 are extensively using a specific application (e.g., a social media application), the access layers 106 and aggregation layers 108 can have edge network components exclusively for supporting the specific applications. The access layers 106 and the aggregation layers 108 can have multiple network components performing MEC located at or near the edge. By being at or near the edge, network components 116 can operate at or near the source of the data source, instead of relying on the cloud to analyze the data packets of the network components 116, and can thus perform edge computing. In doing so, the network components 116 can bring computation and data storage closer to the data source, save bandwidth, and improve response times (e.g., among the user devices 102 and from the network components 116 to third-party components 118, 120, and 120).

The access layers 106, the aggregation layers 108, and the core layer 110 can be adapted to receive third-party components 118, 120, and 122. The third-party components 118, 120, and 122 can be in communication with and/or configured to operate in conjunction with designated network components 116. For example, as shown in FIG. 1, the access layers 106 and aggregation layers 108 can have third-party components 118 and 120 at or near its edge. Like the network components 116, the third-party components 118 and 120 can be adjacent to the edge network components of the access layers 106 and aggregation layers 108. Although not shown in FIG. 1, the third-party components 118, 120, and 122 can also be standalone components, which can operate with other network components 116 and/or third-party components 118, 120, and 122.

Further, the third-party components 118, 120, and 122 can be in communication with the edge network components (not illustrated) of the access layers 106 and aggregation layers 108. The third-party components 118, 120, and 122 and the edge network components can also be MEC components. The third-party components 118 and 120 of the access layers 106 and aggregation layers 108 can be in communication with each other in a similar fashion as the edge network components of the access layers 106 and aggregation layers 108, as discussed above.

Moreover, as illustrated in FIG. 1, the core layer 110 can have a third-party component 122 at or near its center. Accordingly, the third-party components 118 and 120, alone or together with the third-party component 122 of the core layer 110, can provide network and/or application-level visibility, as well as insights and/or predictions, of the user devices 102 and/or the network, as will be discussed in more detail below. In doing so, the third-party components 118, 120, and 122 can permit monitoring of the network and/or acquiring actionable intelligence on user experience in the network. The third-party components 118, 120, and 122 can also have an engine providing network exposure function ("NEF") and/or network data analytical function ("NWDAF").

In some embodiments, the number of third-party components 118, 120, and 122 can depend on the number of network components 116 or, as will be discussed in more detail below, the number and/or type of network actions, characteristics, and/or analytics to be performed. In some embodiments, third-party components 118, 120, and 122 can support each network component 116. Each third-party component 118, 120, and 122 can be in communication with each network component 116 and can be programmed to determine specific analytics and/or specific corrective/preventive network actions. In some embodiments, the number of third-party components 118, 120, and 122 can depend on the congestion in the network. For example, although not illustrated, if the network has high congestion, additional third-party components 118, 120, and 122 can be included in the network to timely provide analytics and/or corrective/preventive network actions.

The third-party components 118, 120, and 122 can also be dynamic and perform various analytical functions for the network. For example, the third-party components 118, 120, and 122 can perform multiple analytical functions (e.g., predicting and clustering) for specific characteristics (e.g., a geographical location of users) of the network. In some embodiments, the third-party components 118, 120, and 122 can perform multiple analytical functions for particular characteristics (e.g., a geographical location of users and an application utilized by user devices 102) of the network.

The third-party components 118, 120, and 122 can be in communication with each other. Upon receipt of pertinent data, the third-party components 118, 120, and 122 can forward the data to specific third-party components 118, 120, and 122 for performing their respective analytical functions of characteristics on the network. This can allow one or more third-party components 118, 120, and 122 to interact with the network (e.g., network components), thus allowing the third-party components 118, 120, and 122 and/or network to operate more efficiently.

Figure 2:
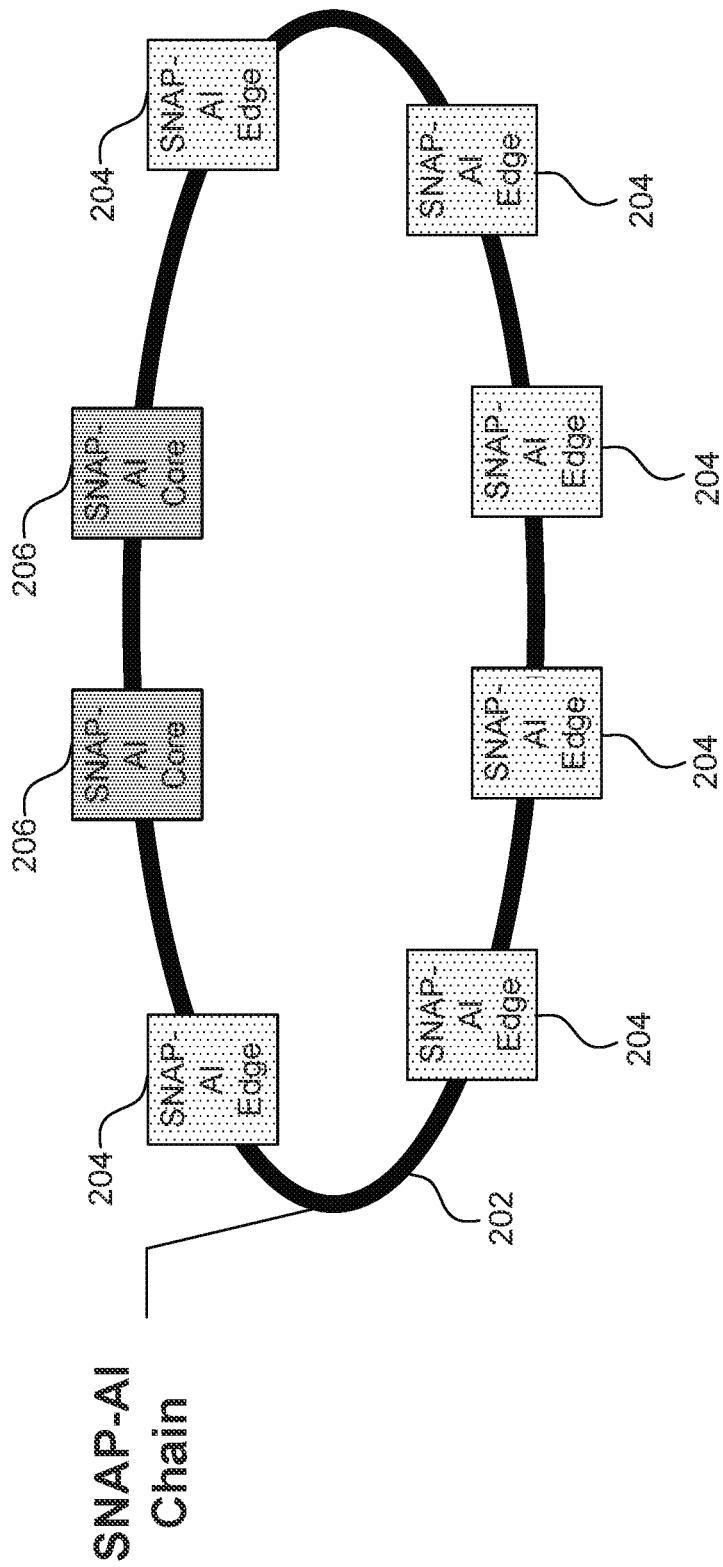
FIG. 2 illustrates a chain connecting third-party components, according to some embodiments.

FIG. 2 illustrates a third-party chain 202 binding multiple third-party components 204 and 206. The third-party components 204 can reside at or near an edge of the access layers 106 and optionally the aggregation layer 108 (both illustrated in FIG. 1). The third-party, components 206 can also optionally reside at or near the center of core layers 110 (illustrated in FIG. 1). The third-party chain 202 can be deployed when multiple third-party components 204 are being utilized on the access layers 106, aggregations layers 108, and/or core layer 110, according to some embodiments. The third-party chain 202 permits communication between third-party components 204 and 206.

The third-party components 204 and 206 can provide network and/or application-level visibility, as well as insights and/or predictions of user devices 102 (illustrated in FIG. 1) and/or the network. In some embodiments, the third-party chain 202 can permit third-party components 204 and 206 to send and/or retrieve some or all of the copies of data packets received from the network components 116 (illustrated in FIG. 1). The third-party chain 202 can also permit a network operator to retrieve some or all of the copies of data packets that the third-party components 204 and 206 receive from the network components 116. The third-party chain 202 can enable continuous validation, correlation, and/or artificial intelligence-driven prediction and/or classification of performance insights including, for example, user, user device, application, network power (e.g., next-generation nodeB (gNB) and evolved nodeB (eNB)), distribution units (DU), small cell, specified areas, and network component interface.

Figure 3:
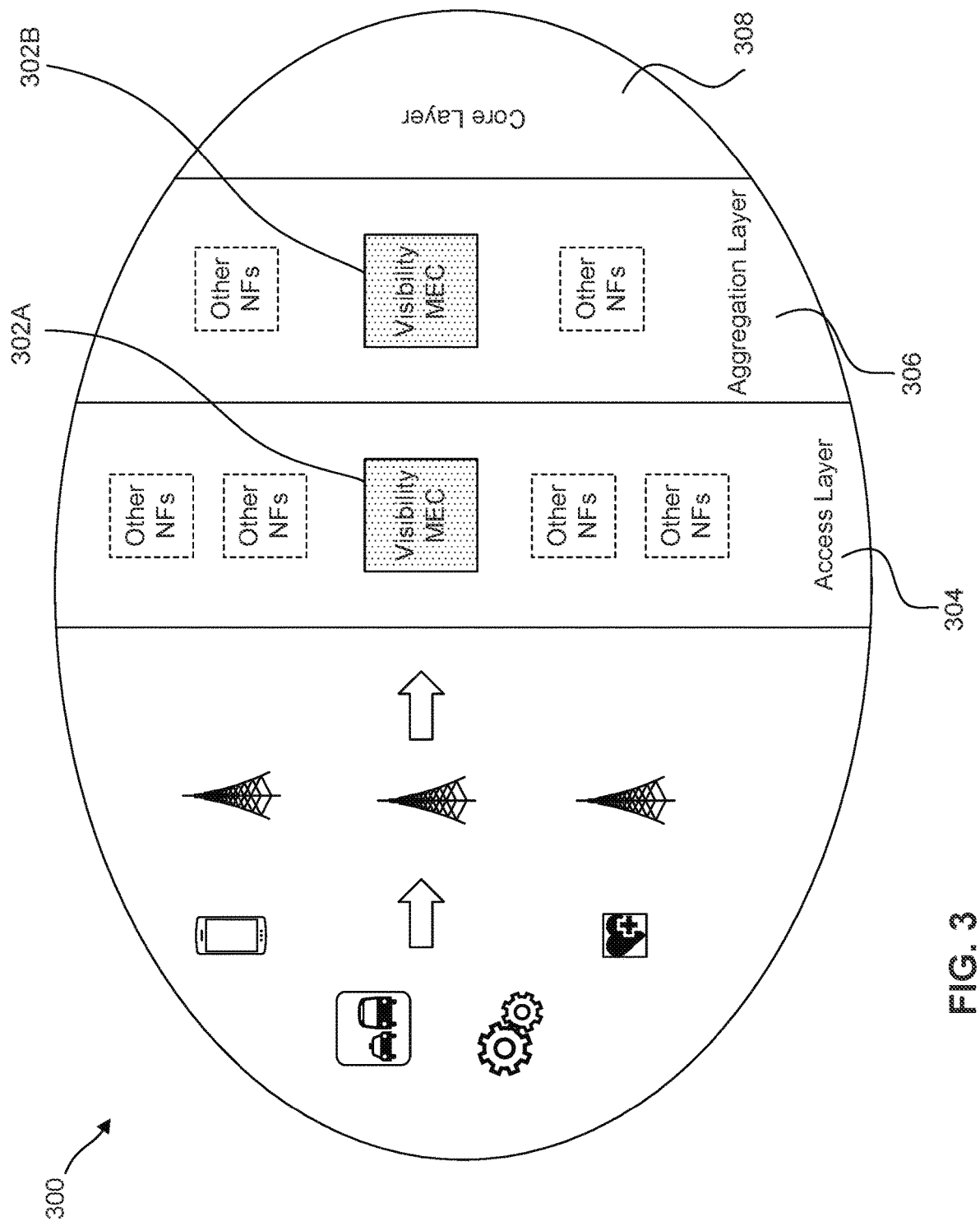
FIG. 3 illustrates an access layer and an aggregated layer that each includes a third-party component, according to some embodiments.

FIG. 3 illustrates third-party components 302A-B connected to a core network 300, according to some embodiments. The core network 300 includes an access layer 304, an aggregation layer 306, and/or a core layer 308. The access layer 304, the aggregation layer 306, and the core layer 308 can include the third-party components 302A-B and network components 308A-F. The third-party components 302A-B can be located at or near an edge of the access layer 304, the aggregation layer 306, and/or the core layer 308, The third-party components 302A-B can be surrounded by the network components 308A-F. In some embodiments, the third-party network components 302A-B can perform multi-access edge computing (MEC).

Referring to FIG. 1, the network components 116 (e.g., cell tower) can be programmed to send copies of data packets received from user devices 102 to the third-party components 118, 120, and 122. The copies of data packets can be sent on a regular interval (e.g., hourly, daily, etc.). The copies of the data packets can also be sent based on an amount of congestion in the network exceeding predefined thresholds. For example, if the amount of network congestion meets or exceeds a first predefined threshold (e.g., 60% congestion), copies of data packets can be sent to the third-party components 118, 120, and 122. And if the amount of network congestion meets or exceeds a second predefined threshold that is greater than the first predefined threshold (e.g., 75% congestion), copies of the data packets can be sent to the third-party components 118, 120, and 122. The third-party components 118, 120, and 122 can receive the data packets in real-time and continually analyze the copies of the data packets to, for example, continually permit timely analytics and/or provide corrective/preventive network actions. The third-party components 118, 120, and 122 can decrypt any encrypted data packets sent from the user devices and/or forwarded by the network components.

Upon receipt of the copied data packets, the third-party components 118, 120, and 122 can decode and parse through the copied data packets. The data packet includes a header, a payload (also called a body), and a trailer. The header includes a plurality of unique identifiers at predefined positions, such as a source IP address, a destination IP address, a source port number, a destination port number, and a protocol identification number, to provide a few examples. The third-party components 118, 120, and 122 can extract the header's unique identifiers. The third-party components 118, 120, and 122 can also derive data based on the header's unique identifiers. Data that can be extracted and/or derived based on the header's unique identifiers include a bandwidth allocated to a particular user, a bandwidth utilized by a particular user, an application used by a particular user, a latency of a network component, a number of users in a given location, and/or network congestion for a given location, to provide a few examples.

The third-party components 118, 120, and 122 can also maintain a rule table that includes a list of rules and network actions. The list of rules can be created by the third-party components 118, 120, and 122 based on the network provider's specification and include network provider specified network actions. Each rule includes multiple unique identifiers that include the header content of a data packet or data derived from such header content. The network actions can specify the type of data to be retrieved and/or derived from the packets, which can be different or the same as that header content used to determine the appropriate rule. In some embodiments, the network actions can relate to specific applications, user devices, networks, users, and geographical regions, to provide a few examples. Example network actions can include dropping certain packets, determining specific types of metadata, determining applications running, identifying packets coming in and out for specified user devices, determining the throughput of the network, determining the quality of the network, and/or determining the quality of service for user/user devices/locations, to provide a few examples.

In some embodiments, the third-party components 118, 120, and 122 can drop (i) http-type packets, (ii) packets larger than a predetermined size (e.g., 1000 bytes), (iii) packets containing predefined patterns which can be specified by the network provider, and/or (iv) packets belonging to certain user devices 102. Further, in some embodiments, the third-party components 118, 120, and 122 can generate metadata relating to (i) a number of packets sent and/or received by a particular user device 102 or multiple user devices 102, (ii) an application used by a particular user device 102 (e.g., social networking applications and banking applications), (iii) location information of a particular user device 102 at a given point of time, and (iv) mobility information of particular user device 102 or set of user devices 102 (e.g., a time and a location requiring network access).

In addition, the third-party components 118, 120, and 122 can determine applications running on user devices 102 by performing a deep packet inspection and identifying a known pattern relating to the applications. In some embodiments, the third-party components 118, 120, and 122 can identify packets by comparing their source and destination addresses to known source and/or destination addresses. Third-party packet components 118, 120, and 122 can also determine network quality, packet throughput, and service quality using industry standards. For example, packet throughput may be used to determine the number of packets exchanged per second.

The third-party components 118, 120, and 122 can maintain or create a separate rule table for different geographical regions, network providers, types of applications, types of users, and objectives/goals, to provide a few examples. This can allow network providers to monitor geographical regions on a micro-level (e.g., city) and/or a macro-level (e.g., state). This can also enable network providers to customize networks to certain types of users and/or geographical regions. Moreover, this can allow network providers to share and analyze data more efficiently.

In some embodiments, upon receipt of a copy of a data packet, the third-party components 118, 120, and 122 can compare the data packet's unique identifiers to each rule's unique identifiers. The third-party components 118, 120, and 122 can identify the rules having the same unique identifiers as those of the data packet. In some embodiments, the third-party components 118, 120, and 122 can identify multiple rules with the same unique identifiers. The third-party components 118, 120, and 122 can then perform the network actions associated with the identified rules. In some embodiments, the rule table can specify a priority for the rules. Thus, the third-party components 118, 120, and 122 can perform the network actions of the rule having the highest priority.

Moreover, after the third-party components 118, 120, and 122 identify one or more rules having unique identifiers that are the same as those of the data packet, the third-party components 118, 120, and 122 can then determine if the data packet is the first packet of a flow of packets between the user devices 102, as will be discussed in more detail below. However, if the data packet's unique identifiers do not match those of any rules, the third-party components 118, 120, and 122 can automatically create a new rule and/or resort to a default rule for the first packet of the flow. For the new rule, the third-party components 118, 120, and 122 can mirror the first packet's unique identifiers. At a later time, the third-party or network operator can designate a network action for the new rule. In the interim, the third-party components 118, 120, and 122 can utilize a temporary network action for the new rule, which can be specified by the third party or network manager. For the default rule, upon receiving data packets having unique identifiers not matching those of other rules, the third-party components 118, 120, and 122 can perform a designated network action, which can be specified by the network providers or the third parties. In some embodiments, default rules cannot be deleted.

In performing the network actions, the third-party components 115, 120, and 122 can perform a deep packet inspection of the data packet's header and/or payload to derive associated metadata. Based on the metadata, the third-party components 118, 120, and 122 can derive characteristics from the data packet or flow of data packets. The characteristics can be specified by the network provider. The characteristics related to a particular data packet and a flow of data packets can include a user location, a user device type, an amount of throughput, a direction of flow, a bandwidth utilization, a latency, a utilized network service, an IP address, and a utilized transport mechanism, to provide a few examples. The characteristics related to a traffic flow of packets can further include a number of users, a number of packets flowing in each direction, a number of utilized network services, a number of utilized transport mechanisms, and a number and type of anomalies, an average length of session per user, a pattern per user, and an average throughput per user, to provide a few more examples. Accordingly, by receiving copies of data packets received by the network components 116 on or near the edge of the network, the third-party components 118, 120, and 122 can derive characteristics that would not have otherwise been readily determined. For example, the third-party components 118, 120, and 122 can determine the strength of radio signals for particular users or user devices 102 and a variation of radio interference signals during user mobility events, to provide a few examples, Thus, the third-party components 118, 120, and 122 can provide more detailed application-level information and/or custom-pattern information.

The network actions can also specify whether the data packet (e.g., metadata and characteristics) is to be forwarded to external sources (e.g., network providers, third parties, and computer analytical tools/engines) based on the derived characteristics. In some embodiments, the third-party components 118, 120, and 122 can then forward the metadata and characteristics upon detecting the desired metadata and/or characteristics. In some embodiments, the network actions can specify receipt of a predetermined number of data packets for forwarding of data packets to external sources (e.g., every fourth data packet). In some embodiments, in sending the metadata and characteristics, the third-party components 118, 120, and 122 can specify an analysis of specific metadata and/or characteristics (e.g., user device applications, user information, etc.) to be performed by the external source. In some embodiments, before forwarding, the third-party components 118, 120, and 122 can perform packet modification to, for example, hide selected information in packets with custom patterns, remove header information, and slice packet payload (e.g., to conserve network bandwidth).

FIG. 4 illustrates an example flow of data packets received by the third-party components 118, 120, and 122 (of FIG. 1). The data packets can have unique properties 410, 412, 414, 416, 418, and 420—i.e., Time, Source, Destination, Protocol, Length, and info. The third-party components 118, 120, and 122 can receive and decode the first data packet 402A. The third-party components 118, 120, and 122 can determine that the first data packet 402A has unique properties 410, 412, 414, 416, and 418. In some embodiments, the third-party components 118, 120, and 122 can create a new rule based on the first data packet 402A's unique properties. The new rule can have the same unique properties as those of the first data packet 402A, In such a scenario, the third-party components 118, 120, and 122 can associate the first data packet 402A with the new rule and perform an action of a rule list's default rule. In some embodiments, the third-party components 118, 120, and 122 can identify a previously-created rule based on the first data packet 402A's unique properties (e.g., previously created upon receipt of a data packet having the same unique properties).

After receipt of the first data packet 402A, the third-party components 118, 120, and 122 can receive five additional data packets 402B-F in the flow of packets. Although the source and destination unique identifiers 412 and 414 are interchangeable (e.g., whereas the data packets 402A and 402B are sent from source "40.97.124.210" to destination "134.141.188.98," the data packets 402C-402E are sent from the source "134.141.188.98" to destination "40.97.124.210"), the same rule as the first data packet 402A can apply. Different protocols 416 can apply to data packets 402A-1 associated with the same rule. For example, although data packets 402A-E invoke the same rule, data packets 402A, 402B, and 402C utilize protocol "TLSv1.2," and data packets 402D and 402E utilize protocol "TCP."

Thereafter, the third-party components 118, 120, and 122 can receive data packet 402F and 402G having unique identifiers 410, 412, 414, and 416. Based on these unique identifiers 410, 412, 414, and 416, the third-party components 118, 120, and 122 can determine that this is a new flow of packets. The third-party components 118, 120, and 122 can identify an appropriate rule and determine the unique characteristics based on data packet 402H and 402I's information 420. The third-party components 118, 120, and 122 can perform the same process for data packets 402H and 402I. Upon identifying an appropriate rule for the data packets 402H and 402I (e.g., a default rule or a previously-provided rule), the third-party components 118, 120, and 122 can identify an appropriate rule and determine the unique characteristics based on data packet 402H and 402I's information 420.

Referring to FIG. 1, in some embodiments, the third-party components 118, 120, and 122 can determine and aggregate characteristics over a period of time (e.g., 30 seconds, 5 minutes, 30 minutes). Along these lines, the third-party components 118, 120, and 122 can also perform analytical functions based on the characteristics over the period of time. For example, for a specific application utilized by user devices 102, the third-party components 118, 120, and 122 can determine the number of users, a type of users, a location of users, an average number of users by device types, a user growth rate, a user retention rate, a user churn rate, an average length of session per user, an average session interval per user, a mobility patterns per user, an average radio strength of users, an average latency, a total throughput data, an average throughput data per user, a total bandwidth utilization, an average bandwidth utilization per user, a quality of service, types of detected errors, an error rate for each detected error, an average network response time, and/or an average request rate, to provide a few examples.

Third parties and/or network providers can then implement timely preventive and corrective actions and provide a quality experience to their customers rather than forward a high volume of traffic to a central entity to carry out the same logic.

Figure 5:
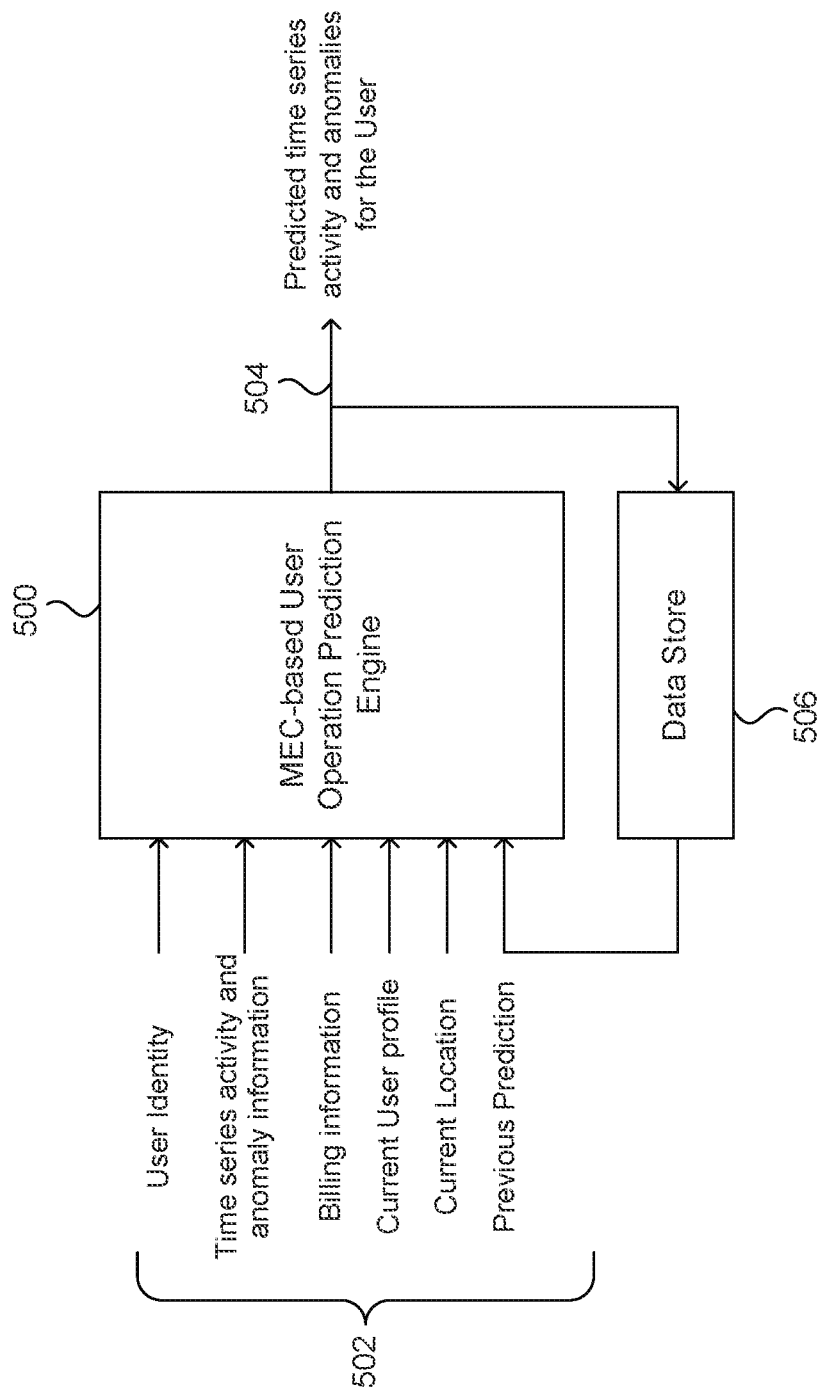
FIGS. 5-8 illustrate prediction engines utilized by third-party components for predicting various characteristics of a network, according to some embodiments.
Figure 6:
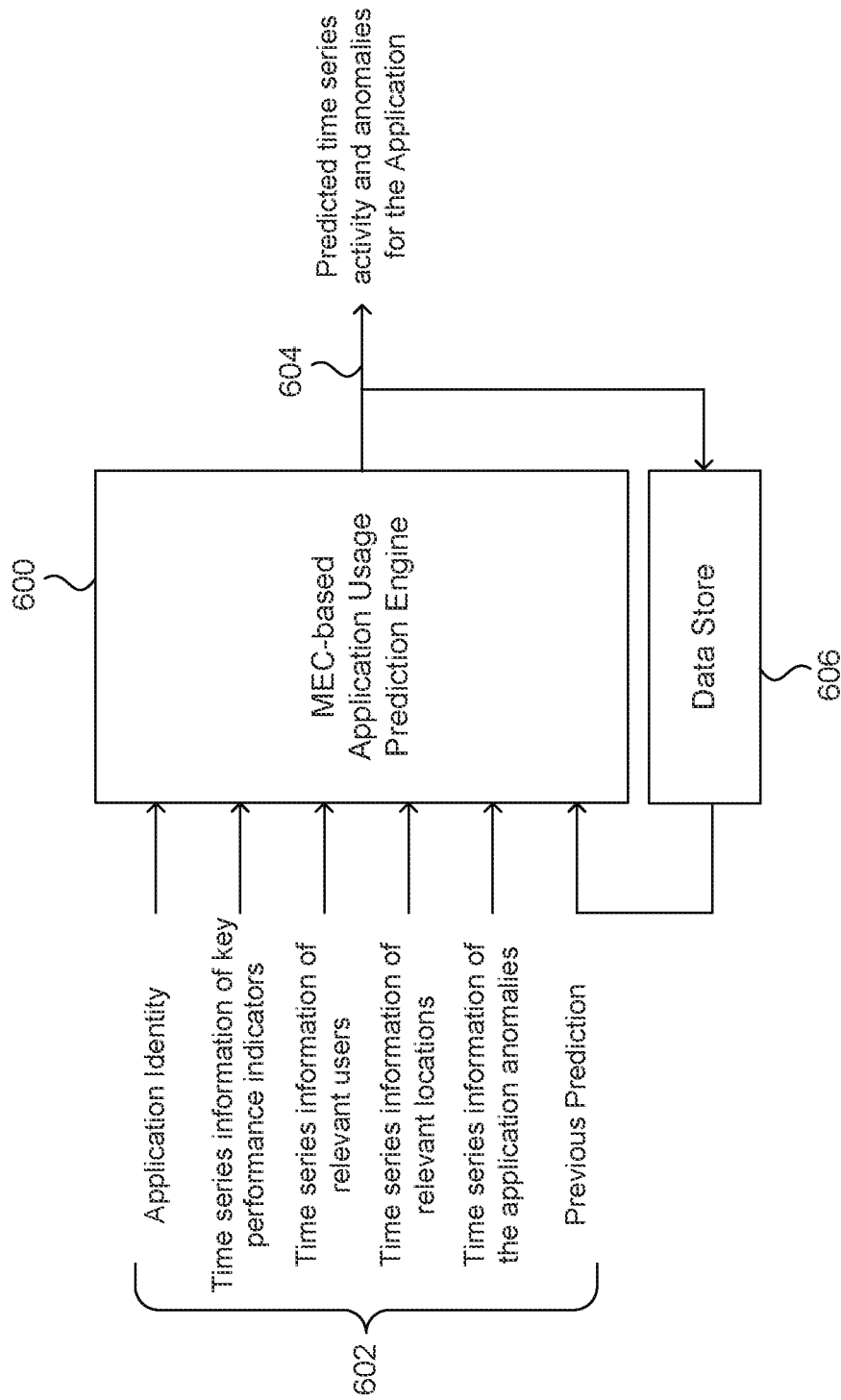
Figure 7:
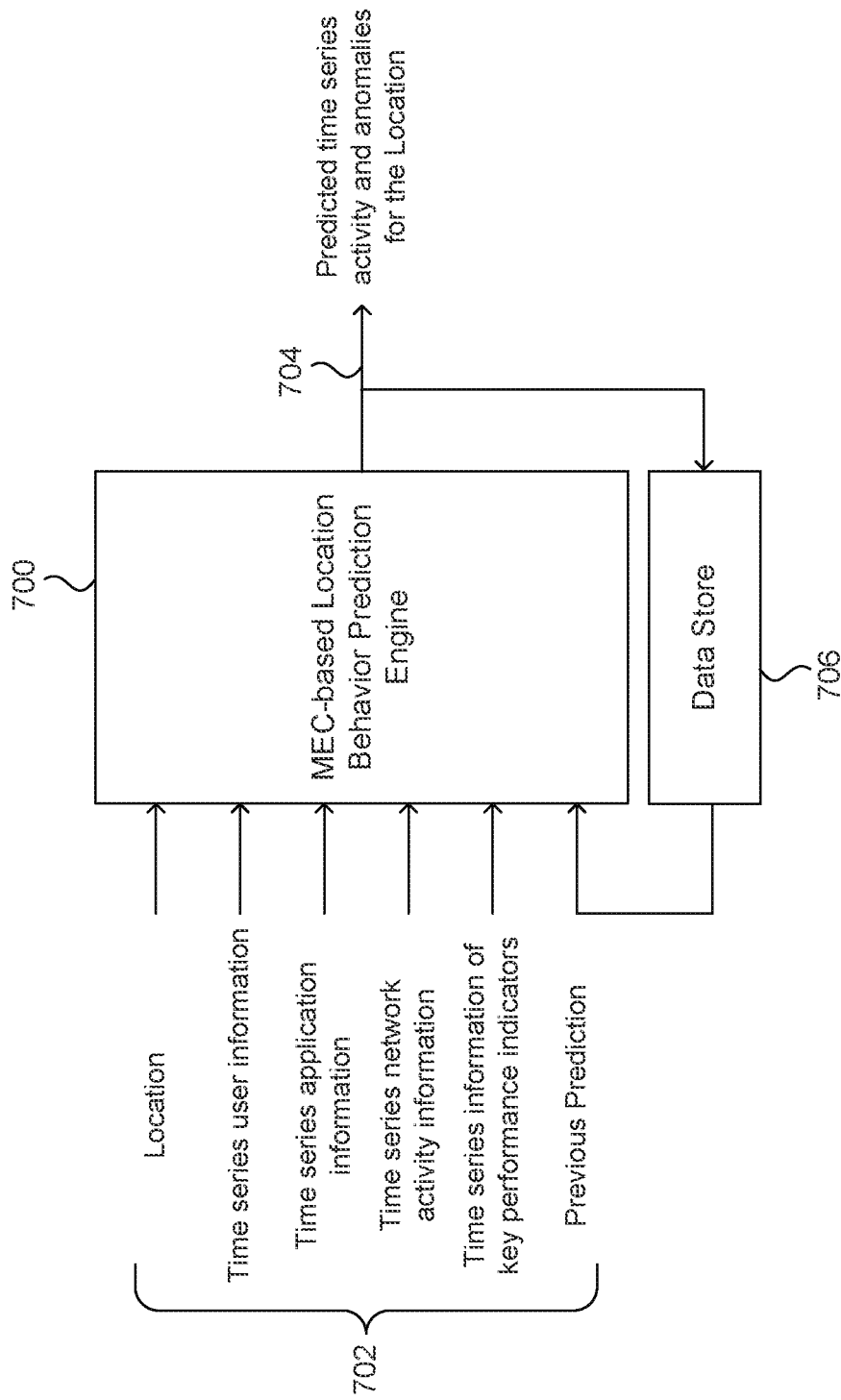
Figure 8:
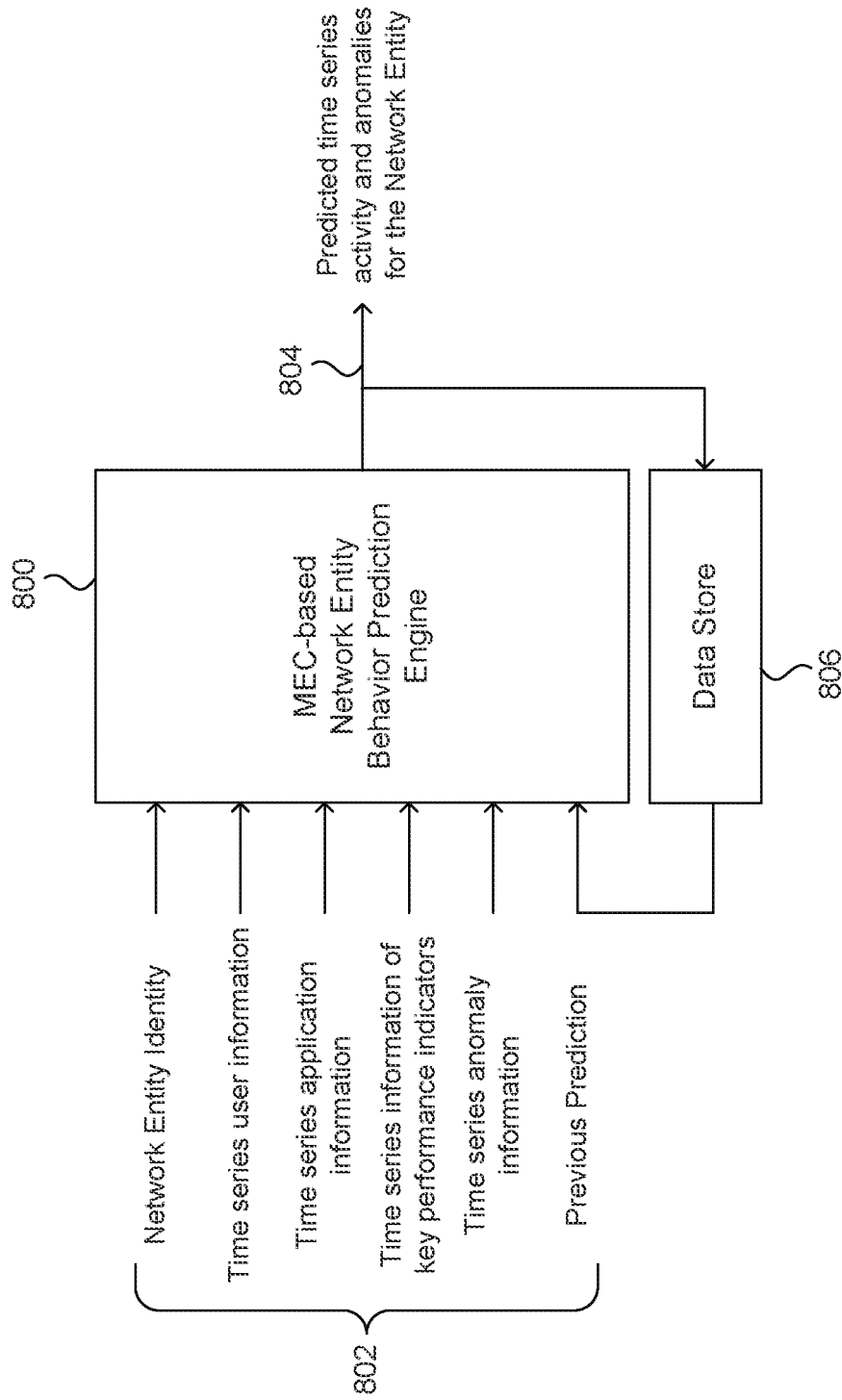

FIGS. 5-8 illustrate various types of prediction engines 500, 600, 700, and 800 utilized by the third-party components 118, 120, and 122 (of FIG. 1) for predicting particular characteristics in a network for a desired period of time, according to some embodiments. In some embodiments, the desired period of time can be provided by the network provider, for example, via an application provided to user devices 102 of FIG. 1. FIG. 5 illustrates a user-operation prediction engine 500 for predicting future operations of users in the network. FIG. 6 illustrates an application-usage prediction engine 600 for predicting future usage of specific types of applications. FIG. 7 illustrates a location-behavior prediction engine 700 for predicting data usage for particular times and/or locations (e.g., 7:00 AM-5:00 PM in office buildings) in the network, the type applications used at specific locations (e.g., social media application on campuses) in the network, or any other network characteristic described above at particular locations in the network, FIG. 8 illustrates a network-entity behavior prediction engine 800 for predicting future actions of a specific location in the network.

The user-operation prediction engine 500, the application-usage prediction engine 600, the location-behavior prediction engine 700, and the network-entity behavior prediction engine 800 can receive a respective number of inputs 502, 602, 702, and 802, which can be from different sources. For example, the inputs 502, 602, 702, and 802 can be from data extracted from the received data packets, data provided by the network providers, data received/determined from other third party or network components, and/or the outcome of the prediction engine, as will be described below.

The user-operation prediction engine 500's inputs 502 can include a user identity, time-series activity, anomaly information, billing information, current user profile, current location, and/or previous predictions. The user identity can be for a single user or a group of users. The user identity can be a subscriber subscription permanent identifier (SUPI), a permanent equipment identifier (PEI), a mobile station international subscriber directory number (MSISDN), and/or a generic public subscription identifier (GPSI).

The application-usage prediction engine 600's inputs 602 can include an application identity, time-series information of key performance indicators (KPIs), time-series information of relevant users, time-series information of relevant locations, time-series information of the application anomalies, and/or previous predictions. The KPIs can include latency, throughput, and volume of data consumed. The time-series information of relevant users can relate to those who assessed the application and can include groups and unique identity. The time-series information of the relevant locations and the relevant application anomalies can be from which the application was assessed.

The location-behavior prediction engine 700's inputs 702 can include a location, time series user information, time-series network activity information, time-series information of KPIs, and/or previous predictions. The time series user information can be user density, user groups or types, device types, and/or unique user identity. The times series application information can relate to the specific location monitored. The times series network information can be for a particular network component dedicated to the specific location (e.g., a radio tower and a network edge). The time-series information of KPIs can include latency, the volume of the data consumed, and/or throughput utilization.

The network-entity behavior prediction engine 800's inputs 802 can include a network entity identity or group identifier, time-series user information, time-series application information, time-series information of KPIs, time-series anomaly information, and/or previous predictions. The time-series user information can include user density, user groups or types, device types, and/or unique user identity. The time-series application information can be accessed through the network entity. The time-series information of Kr % can include latency, the volume of data consumed, and/or throughput utilization. The time-series anomaly information can include a history of anomalies on the network entity.

Moreover, based on the inputs 502, 602, 702, and 802, the user operation prediction engine 500, the application usage prediction engine 600, the location behavior prediction engine 700, and the network-entity behavior prediction engine 800 can respectively provide unique outputs 504, 604, 704, and 804. The outputs 504, 604, 704, and 804 can provide predicted time series activity. For example, the user-operation prediction engine 500's outputs 504 and the application-usage prediction engine 600's outputs 604 can provide activities and/or anomalies for user operation and a user application usage over a specified time in the future, respectively. The location-behavior prediction engine 700's output 704 can provide a behavior pattern at a geographical location (e.g., estimated KPI, user groups, and anomalies) for a given time period in the future. The network-entity behavior prediction engine 800's output 804 can provide an exact behavior by the network components 116 (of FIG. 1) over a period of time in the future. The predicted time series activity of outputs 504, 604, 704, and 804 can include predicted future anomalies.

Further, the user-operation prediction engine 500's, the application-usage prediction engine 600's, the location-behavior prediction engine 700's, and the network-entity behavior prediction engine 800's can store outputs 504, 604, 704, and 804 for a given period of time in a database 506, 606, 706, and 806, respectively. The user-operation prediction engine 500, the application-usage prediction engine 600, the location-behavior prediction engine 700, and the network-entity behavior prediction engine 800 can then provide the outputs 504, 604, 704, and 804 as an input when analyzing the given period of time. This can allow the user-operation prediction engine 500, the application-usage prediction engine 600, the-location behavior prediction engine 700, and/or the network-entity behavior prediction engine 800 to more accurately predict the respective output 504, 604, 704, and 804 over a period of time in the future.

Figure 9:
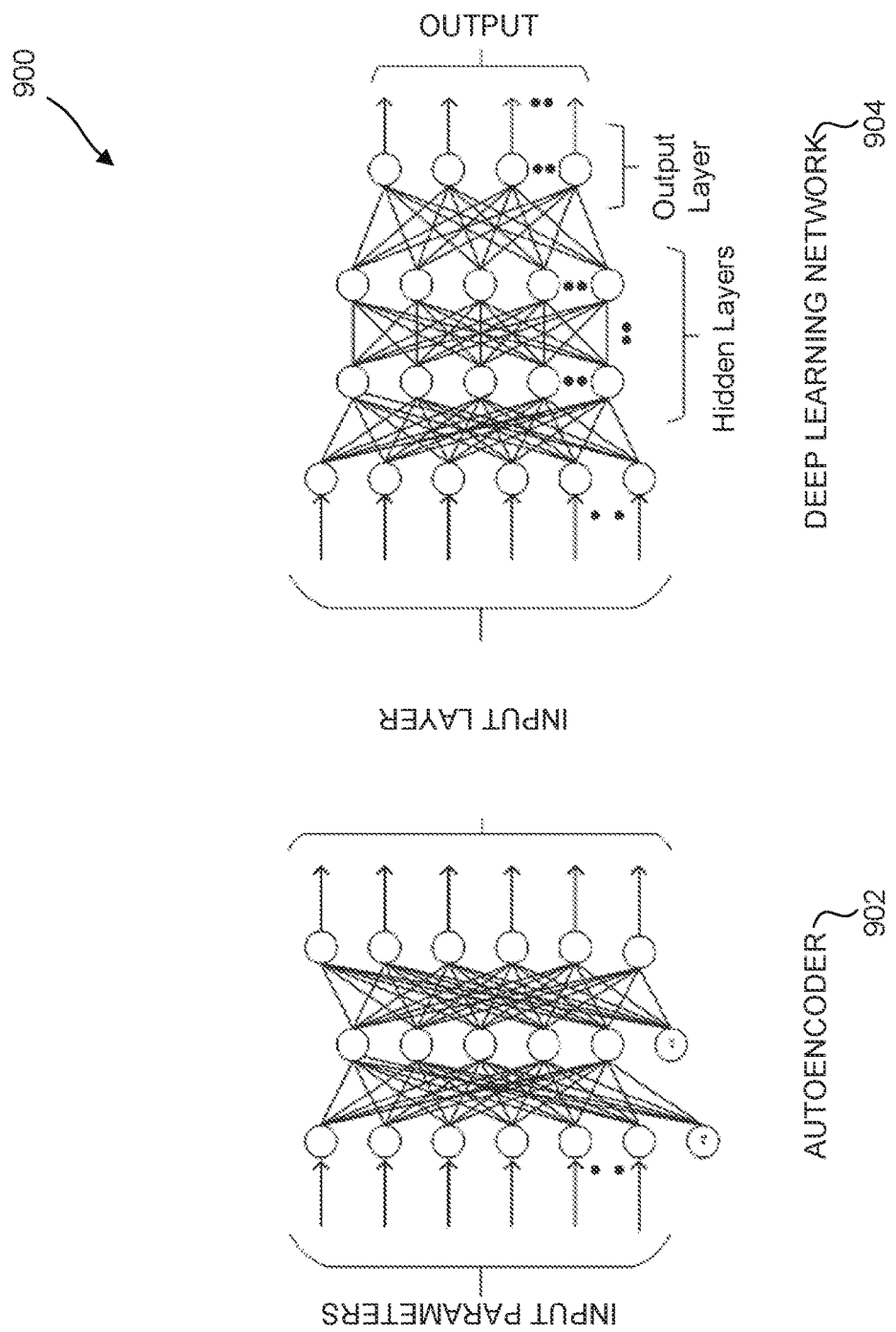
FIG. 9 illustrates an autoencoder-deep learning network configuration utilized by a prediction engine, according to some embodiments.

FIG. 9 illustrates an autoencoder-deep learning network configuration 900 utilized by prediction engines 500, 600, 700, and 800 (of FIGS. 5-8), according to some embodiments. The autoencoder-deep learning network configuration 900 can include an autoencoder 902 and a deep learning network 904. The autoencoder 902 can receive inputs over a specified period of time (e.g., 1 hour, 1 week, 1 month, and 1 year), As described above, the prediction engines 500, 600, 700, and 800 (of FIGS. 5-8) may receive different inputs. The autoencoder 902 utilized by the user-operation prediction engine 500 can receive inputs relating to user identity, time-series activity and anomaly information, billing information, current user profile, current location, and/or previous predictions. The autoencoder 902 utilized by the application-usage prediction engine 600 can receive inputs relating to application identity, time series of KPIs, other relevant information, other relevant users, application anomalies, and/or previous predictions. The autoencoder 902 utilized by the location-behavior prediction engine 700 can receive inputs relating to a location, time series user information, time-series network activity information, time-series information of KPIs, and/or previous predictions. The autoencoder 902 utilized by the network-entity behavior prediction engine 800 can receive inputs relating to network entity identity or group identifier, time-series user information, time-series application information, time-series information of KPIs, time-series anomaly information, and/or previous predictions.

In some embodiments, the autoencoder 902 can be trained to determine a representative data (e.g., compressed data) using designated algorithms based on the respective inputs of the prediction engines 500, 600, 700, and 800 (of FIGS. 5-8). In doing so, autoencoder 902 can filter out unneeded or unrepresentative data and retain applicable information based on, for example, previous predictions. In some embodiments, the representative data can be less than the input data.

The autoencoder 902 provides the representative data as input to the deep learning network 904. The deep learning network 904 can include a number of hidden layers. For example, in some embodiments, the deep learning network 904 can include 16 hidden layers. The number of neurons can vary across the hidden layers. Each neuron receives input from autoencoder 902 and can derive a part of the outcome ultimately provided by the deep learning network 904. The deep learning network 904 can predict the activity for a desired period of time in the future. In doing so, the deep learning network 904 can also predict expected anomalies during the desired period of time. In some embodiments, the autoencoder 902 may be a variational autoencoder. In some embodiments, the deep learning network 904 may be a deep belief network and a neural network, to provide a few examples.

Referring to FIG. 1, using the prediction engines 500, 600, 700, and 800 (of FIGS. 5-8), the third-party components 118, 120, and 122 can predict an expected baseline of normalcy for characteristics over a desired period of time for the network. The baseline of normalcy can be different for given points in time during the period of time. Further, the period of time can be specified by the network provider.

Accordingly, after receipt of data packets and deriving the characteristics, the third-party components 118, 120, and 122 can determine if the characteristic is an anomaly or an expected outcome based on the baseline of normalcy for the specified period of time. The anomaly can be different from the expected outcome or a deviation of a predesignated threshold from the expected threshold. The predesignated threshold can be specified by the third-party managing the third-party components 118, 120, and 122 or by the network provider. In some embodiments, the third-party component 118, 120, 122 can update a baseline of normalcy based on data packets received during the designated period of time. For example, if the anomaly is maintained over a period of time, the baseline can be updated to include the anomaly. Conversely, if the anomaly is a one-time occurrence, the baseline may not be updated.

Referring to FIG. 1, as described above, the third-party components 118, 120, and 122 can cluster the characteristics of data packets (e.g., user's identification, applications, network entities, and locations) into a number of groups (e.g., 2, 3, 5, and 10). In some embodiments, the third-party components 118, 120, and 122 can use a neural network-based mechanism that transforms the various characteristics of a data packet into a latent representation of the data packets. Example neural network-based mechanisms include a deep learning network, a multilayer perceptron, a deep belief network, a convolutional neural network, a variational autoencoder, and a generative adversarial network, to provide a few examples. Accordingly, for example, the third-party components 118, 120, and 122 can provide a latent representation relating to the user device 102's application usage behavior based on locations and/or mobility patterns.

Figure 10:
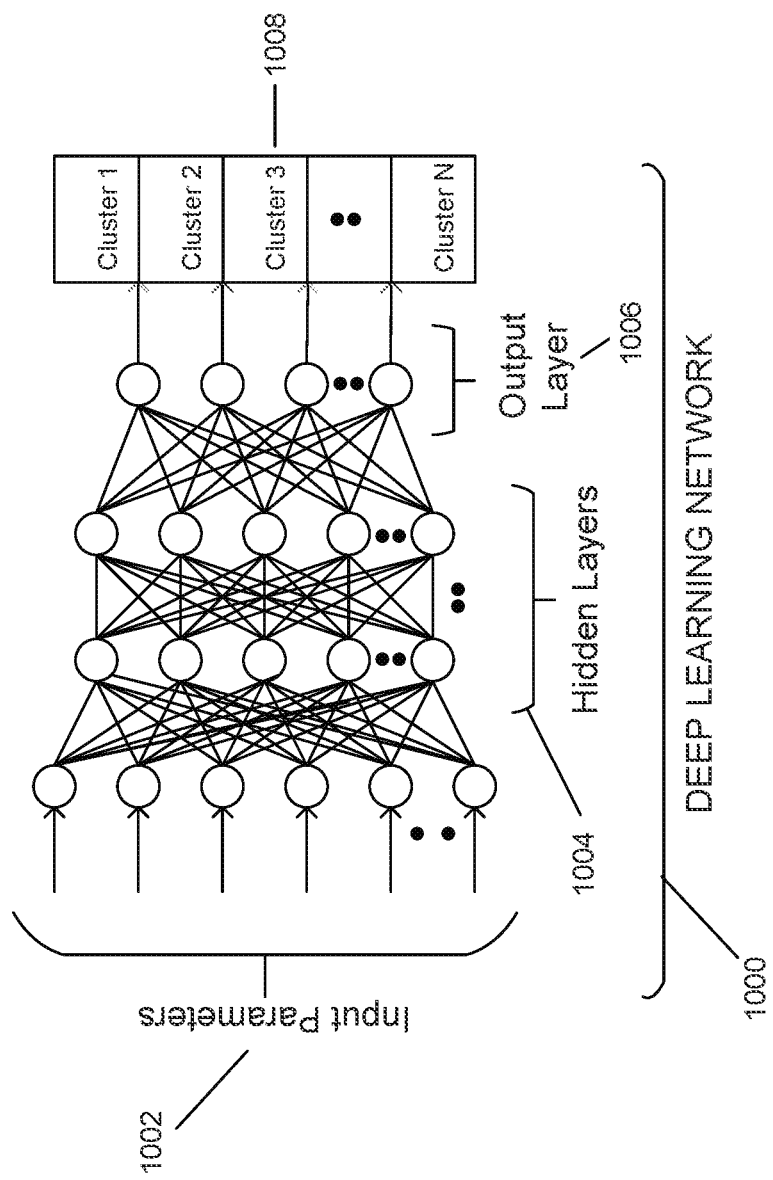
FIG. 10 illustrates a deep learning network utilized by a prediction engine, according to some embodiments.

After determining the latent representation, the third-party components 118, 120, and 122 can use a deep learning network for clustering the data packets. In some embodiments, the third-party components 118, 120, and 122 can perform classification based on characteristics selected by the network provider, for example, in an application provided to user devices 102. FIG. 10 illustrates an example deep learning network 1000 that can receive inputs 1002 of various latent representations of particular characteristics relating to a user, geographical location, and/or entity. For example, as stated above, the latent representation can relate to a user device's application usage behavior based on locations and/or mobility patterns. As explained above, with respect to FIG. 9, the deep learning network 1000 can identify a predetermined number of hidden layers 1004. For example, in some embodiments, the predetermined number of hidden layers 1004 can be 16. The deep learning network 1000 can then derive outputs 1006 corresponding to associated clusters 1008. In some embodiments, the data packets can be grouped based on a user's behavioral aspects as specified in the derived characteristics (e.g., subscribers, applications, network entities, and locations). Behavioral aspects for users can include application usage, the volume of data consumed, and mobility behavior, to provide a few examples. Behavioral aspects for applications can include the type of data (e.g., video), a predefined throughput requirement, and average latency, to provide a couple of examples. Behavioral aspects for network entities can include network capacity, average load, user density, and anomaly characteristics. Behavioral aspects for geographical locations can include user density, anomaly characteristics, and most-used application types, to provide a few examples.

Figure 11:
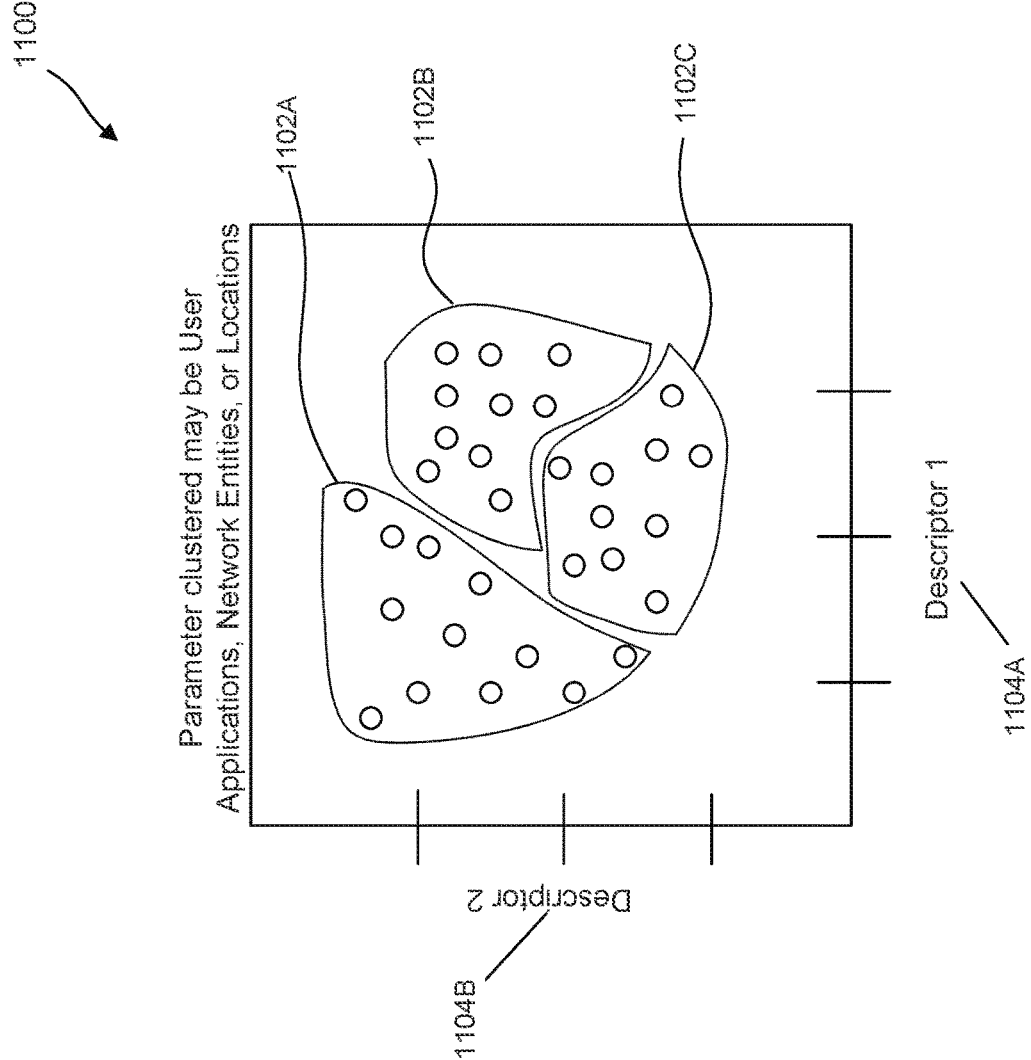
FIGS. 11 and 12 illustrate data clustering performed by a third-party component, according to some embodiments.

FIG. 11 illustrates an example clustering 1100 of packets performed by the third-party components 118, 120, and 122 (of FIG. 1) for a particular characteristic (e.g., user's identification, applications, network entities, and/or locations). For example, the third-party components 118, 120, and 122 can determine that the packets are to be grouped into three separate groups 1102A-C. The three separate groups 1102A-C can be defined by one or more parameters 1104A-B of the characteristic. As described above, parameters of subscribers can relate to data used to monitor application usage, the volume of data consumed, and mobility behavior. Parameters of applications can relate to data used to monitor a data type, a throughput requirement, and an average latency. Parameters of network entities can relate to data used to monitor capacity, average load, subscriber density, and/or anomaly characteristics. Parameters of locations can relate to data used to monitor subscriber density, anomaly characteristics, and/or most-used application dates. In some embodiments, the third-party components 118, 120, and 122 determine that there are three separate groups 1102A-C based on application usage and location. The groups 1102A-C can be defined (or illustrated) based on a first parameter (e.g., location) 1104A and a second parameter (e.g., application usage) 1104B.

Referring to FIG. 1, the third-party components 118, 120, and 122 can classify data packets into a number of groups (e.g., 2, 3, 5, and 10) based on derived characteristics (e.g., user identification, application, network entities, and locations). In some embodiments, the third-party components 118, 120, and 122 can perform classification based on characteristics selected by the network provider, for example, in an application provided to user devices 102. The third-party components 118, 120, and 122 can use a binary or multiclass classifier, which is based on classification algorithms implementing decision trees, support vector machine, naïve Bayes trees, k-nearest neighbor algorithm, and/or density-based spatial clustering of applications with noise. The users can be classified based on an associated identifier, a volume of data being transported, a roaming identification, and/or a specific device type. The applications can be classified based on known specific patterns. The network entities and locations can be classified as predefined labels based on specific characteristics.

Figure 12:
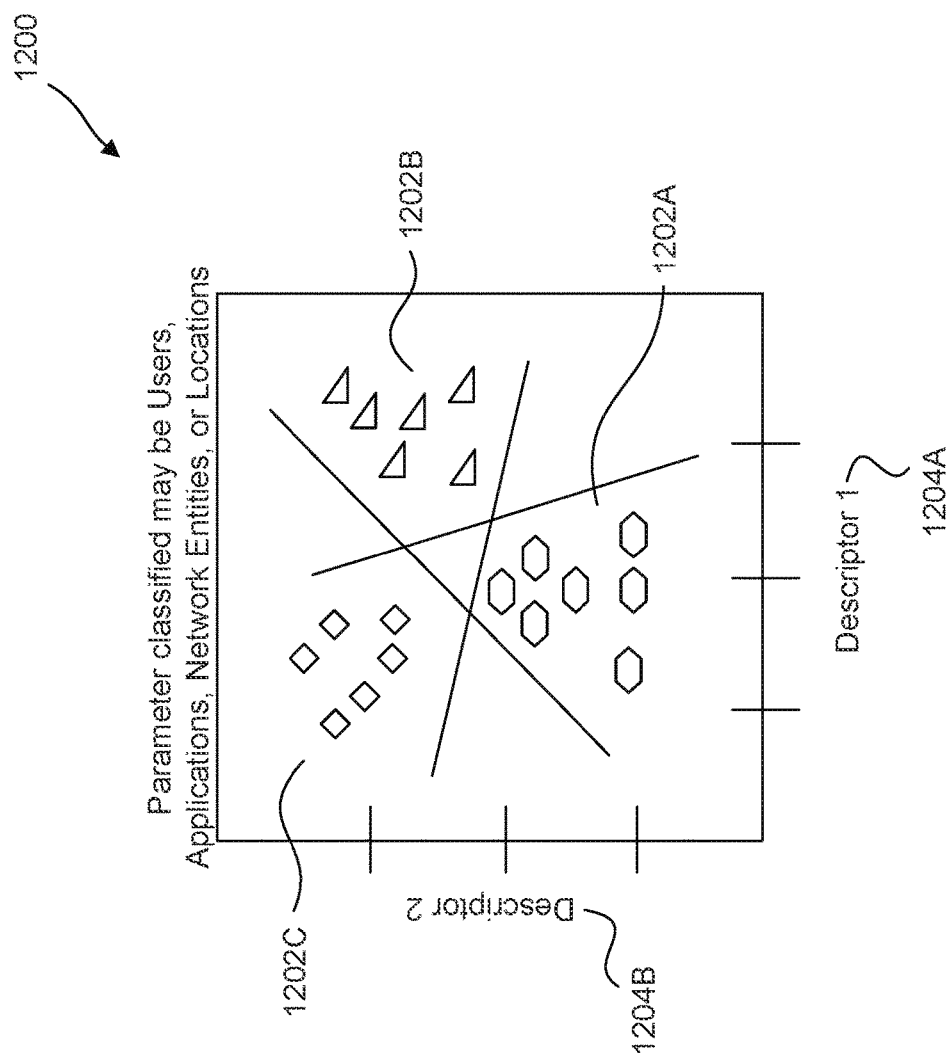

FIG. 12 illustrates an example classification 1200 of packets performed by the third-party components 118, 120, and 122 (of FIG. 1) for a particular characteristic (e.g., user's identification, applications, network entities, and locations). For example, the third-party components 118, 120, and 122 can determine that the packets are to be grouped into three separate groups 1202A-C. The three separate groups 1202A-C can be defined by one or more parameters 1204A-B of the characteristic. Groups 1202A-C and parameters 1204A-B are similar to group 1202A-C and parameters 1204A-B described above with respect to FIG. 11.

Figure 13:
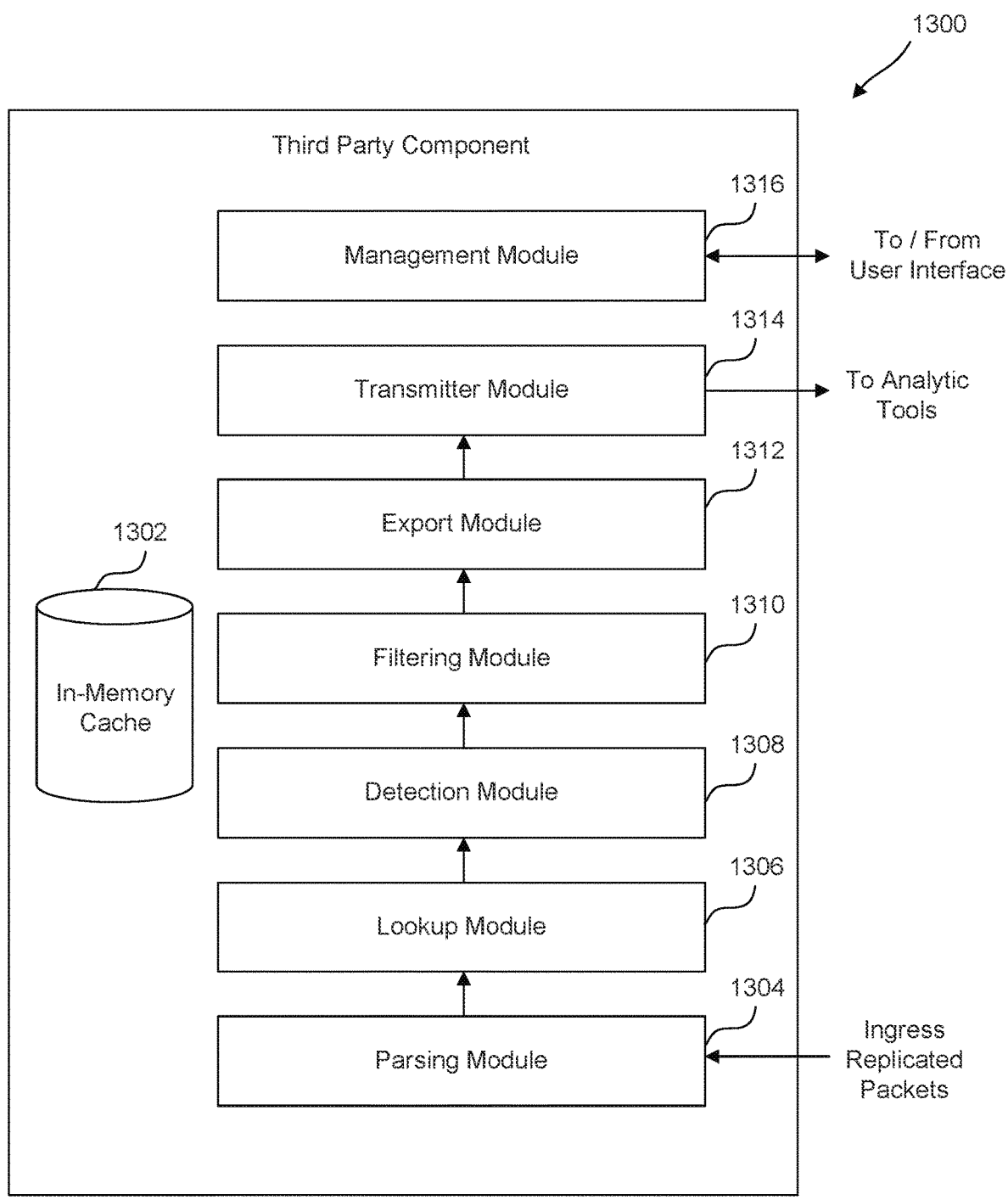
FIG. 13 illustrates a block diagram of a third-party component, according to some embodiments.

FIG. 13 illustrates a block diagram of an example third-party component 1300. The third-party component 1300 can include a memory 1302, a parsing module 1304, a lookup module 1306, a detection module 1308, a filtering module 1310, an export module 1312, a transmitter module 1314, and/or a management module 1316. The memory 1302 can store rules for received flows, as discussed above with respect to FIG. 1. The parsing module 1304 can receive a copy of data from network components that reside at or near the network's edge. The parsing module 1304 can then parse through the received copy of data and extract relevant information. The lookup module 1306 can determine if there are any pertinent rules for performing actions for the extracted information based on the extracted information. The lookup module 1306 can also perform updating and/or creating rules. The detection module 1308 can perform a deep packet inspection of the extracted information to determine the characteristics of the extracted information. The filtering module 1310 can identify relevant characteristics per the network operator's configuration. The export module 1312 can derive metadata for the relevant characteristics. The transmitter module 1314 can forward the metadata to specified external analytical tools. The management module 1316 can permit a third party and/or network operator to configure the modules of the third-party component 1300.

Figure 14:
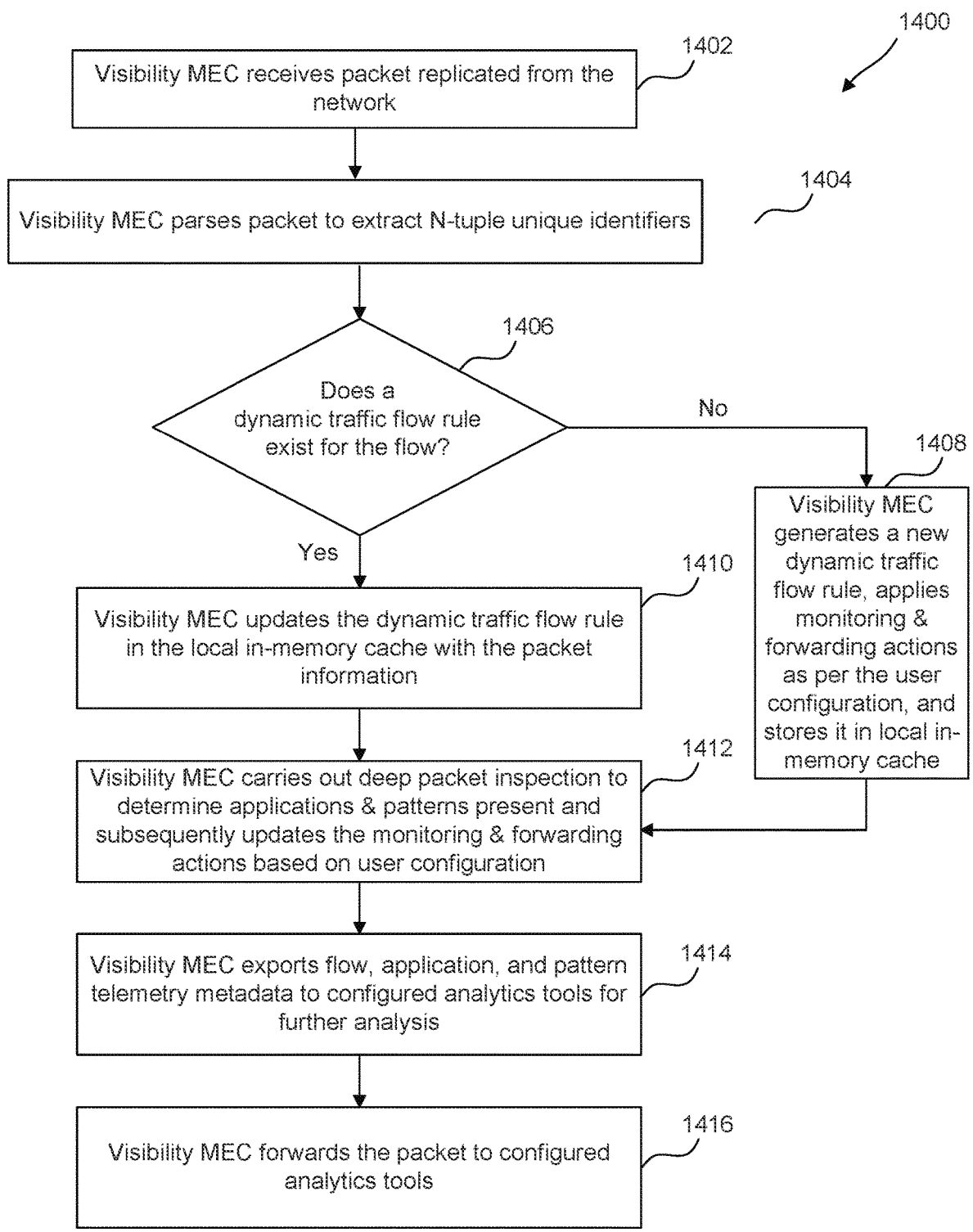
FIG. 14 illustrates a method for providing traffic visibility in a network, according to some embodiments.
Figure 15:
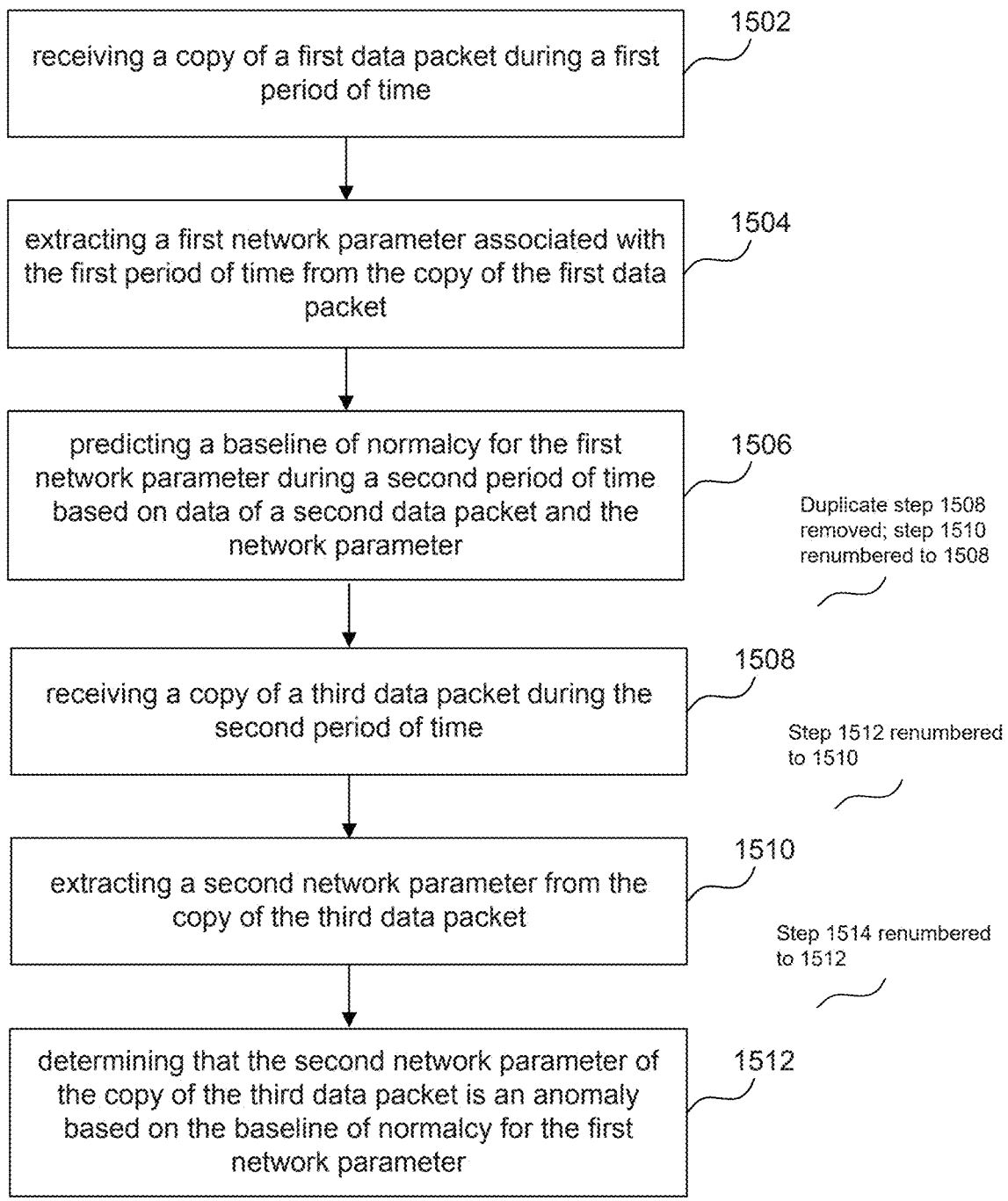
FIG. 15 illustrates a method for determining an anomaly during a specified period time based on past data, according to some embodiments.

FIG. 14 illustrates a method 1400 for providing traffic visibility in a network, according to some embodiments. FIG. 15 illustrates an example method for deriving an anomaly over a specific period of time based on past data. Methods 1400 and 1500 can be performed by processing logic that can include hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously or in a different order than shown in FIGS. 14 and 15.

Referring now to FIG. 14, method 1400 shall be described with reference to FIG. 1. However, method 1400 is not limited to that example embodiment.

At 1402, the third-party component (e.g., one or more of third-party components 118, 120, and/or 122) can receive a copy of a data packet from the network. The third-poi ty component can specifically receive a copy of the data packet from a MEC that supports telecommunication and is located at or near an edge of the network. The copy of the data packet can be of data received from user devices in the network. The data can be any data transmitted by a user device, for example, to a server or another user device. Data may relate a specific application (e.g., a social media application), an electronic message (e.g., a text message, a picture message, an email), and internee usage, to provide a few examples.

At 1404, the third-party component can extract unique identifiers from the packet. This can allow the data packets per user, per radio interface type, per radio unit (e.g., NR gNB/eNode B/Node B/RNC/BSC/Access Point, etc.), and per location (e.g., routing/tracking/area codes and cell identity) to be uniquely identified. The unique identifiers may include a transmitted time, a source, a destination, a protocol, a length, and/or incorporated information.

At 1406, the third-party component can determine if there is a rule for the packet's unique identifiers. For example, a rule table can include a plurality of rules that each include a plurality of identifiers and an action. The third-party component can compare the packet's unique identifiers to each rule's unique identifiers to determine if there is a rule in the table that includes matching unique identifiers. The rules actions can relate to certain applications, user devices, networks, users, and geographical regions, to provide a few examples. The actions can include forwarding the received and/or derived data to external locations for further storage and/or analytics. For example, the actions can include dropping certain packets, generating specific metadata, determining applications running, determining packets coming in and out of specified users/user devices, determining the throughput of the network, determining the quality of the network, and/or determining the quality of service for users/user devices/locations.

At 1408, if a rule does not exist for the packet's unique identifiers, the third-party component can generate a new rule by determining appropriate actions to perform with the packet's unique identifiers and store the rule in local memory. In generating the new rule, the third-party component can determine one or more relevant actions to perform with the packet's unique identifiers. For example, if the packet's unique identifiers related to a particular type (e.g., a particular user device application), the third-party component can determine an appropriate action to be taken (e.g., determining a required bandwidth).

At 1410, if the rule does exist, the third-party component can update the rule based on the packet's unique identifiers. For example, the rule table can include a default rule for grouping information of data packets, including unique identifiers for different existing rules in the rule table. Accordingly, after identifying packets having unique identifiers different from those of existing rules in the rule table, the third-party component can create a rule for future network packets having the same unique identifiers as those received. The network provider may provide an action for the created rule.

At 1412, after creating the new rule or updating the existing rule, the third-party component can carry out a deep packet inspection to determine characteristics (e.g., application and patterns) of the extracted information and update the actions of the rule based on the extracted information. The third-party component can then derive metadata based on the determined characteristics.

At 1414, the third-party component can forward the metadata to external analytical tools for future analysis. In some embodiments, the third-party component can forward derived characteristics of the packet to analytical tools for future analysis. The analytical tools can be preconfigured to process and analyze the derived metadata. This can allow the third-party component and/or the network operator to store, manage, and analyze similarly-derived metadata at a later time. Examples of further analysis by the configured tools can be carrying out statistical analysis on the data for different derived characteristics to identify whether a behavioral pattern exists over a period of time.

At 1416, the third-party component can forward the packet in addition to the derived metadata—to external analytical tools for further analysis. Before doing so, the third-party component can modify the packet, for example, by hiding selected information in packets with custom patterns, removing header information, and/or slicing packet payload. The analytical tools can be preconfigured to process and analyze the original packet. This can allow third-party components and/or the network operator to analyze the packets in various ways.

Referring now to FIG. 15, method 1500 shall be described with reference to FIG. 1. However, method 1500 is not limited to that example embodiment.

At 1502, the third-party component (e.g., one or more of third-party components 118, 120, and/or 122) can receive a copy of a first data packet during a first period of time from a network component. In some embodiments, the third-party component and the network component can be located at an edge of a network.

At 1504, the third-party component can extract a first network parameter associated with the first period of time from the copy of the first data packet. The first network parameter is associated with one or more of a user device operation, a user device application usage, a user device location behavior, and a network-entity behavior pattern.

In some embodiments, the third-party components can also derive a network characteristic associated with the first period of time based on the copy of the first data packet and the data relating to the copy of the second data packet. In some embodiments, the network characteristics include an amount of throughput, a direction of flow, a bandwidth utilization, a latency, and/or a utilized network service.

At 1506, the third-party component can predict a baseline of normalcy for the first network parameter during a second period of time after the first period of time based on data associated with a copy of a second data packet and the first network parameter of the first data packet. The baseline of normalcy can provide the expected network parameter from one or more network components during the period of time. In some embodiments, the baseline of normalcy behavior can be different for specific points in time during the second period of time.

In some embodiments, the data relating to the copy of the second data packet is provided by the network component to the third-party component. For example, the data relating to the copy of the second data packet can be another network parameter different or the same as the first network parameter.

In some embodiments, the baseline of normalcy for the first network parameter can be further based on derived network characteristic parameters. In some embodiments, the baseline of normalcy for the first network parameter can be further based on network provided input. In some embodiments, the network provided input is not provided by the network components and can be provided by the network provider. In some embodiments, the network provided input is unique to a user. In some embodiments, the network provided input includes a key performance indicator relating to the first network parameter.

In some embodiments, the baseline of normalcy for the first network parameter can include a first point in time and a second point in time such that the baseline of normalcy for the first point in time is different than the baseline of normalcy for the second point in time. In some embodiments, the baseline of normalcy includes an expected behavior by the network components.

At 1508, the third-party component can receive a copy of a third data packet during the second period of time from the network component. The second period of time can be after the first period of time and can represent a future period of time.

At 1510, the third-party component can extract a second network parameter from the copy of the third data packet, Similar to the first network parameter, the second network parameter can be associated with one or more of a user device operation, a user device application usage, a user device location behavior, and a network-entity behavior pattern. In some embodiments, the first and second network parameters can be related to the same type of data.

At 1512, the third-party component can determine that the second network parameter of the copy of the third data packet is an anomaly based on the baseline of normalcy for the first network parameter. In some embodiments, the anomaly can be the second network parameter of the copy of the third data packet exceeding the baseline of normalcy. In some embodiments, the network provider or third-party entity can specify that exceeding the baseline of normalcy by a predetermined amount can be an anomaly.

Figure 16:
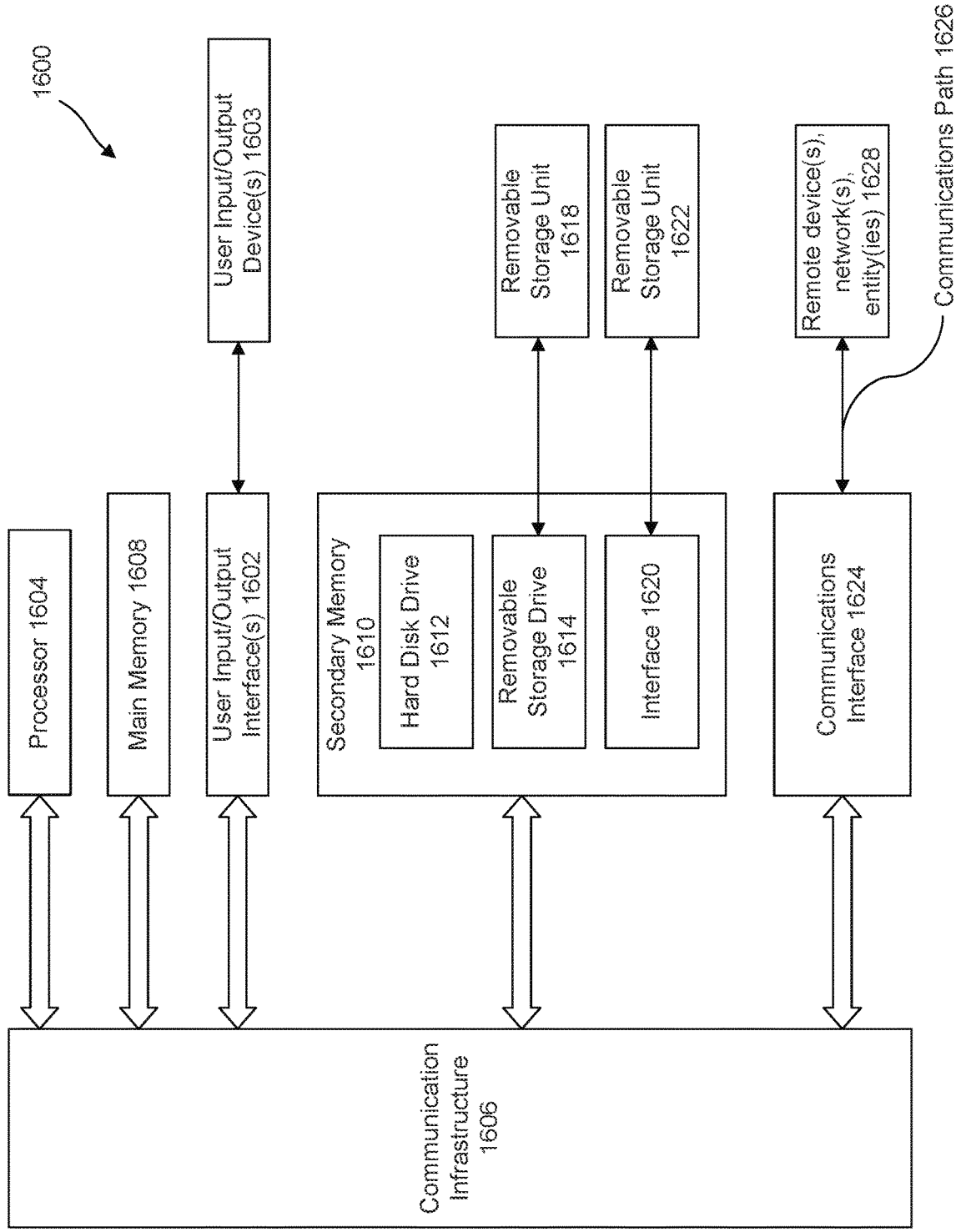
FIG. 16 is an example computer system for implementing various embodiments.

Various embodiments, as described above, can be implemented, for example, using one or more well-known computer systems, such as computer system 1600 shown in FIG. 16, One or more computer systems 1600 can be used, for example, to implement any of the embodiments discussed herein, as well as combinations and sub-combinations thereof. For example, the third-party components 118, 120, 122 (of FIG. 1) can be implemented using computer system 1600.

Computer system 1600 can include one or more processors (also called central processing units, or CPUs), such as a processor 1604. Processor 1604 can be connected to a communication infrastructure or bus 1606.

Computer system 1600 can also include user input/output device(s) 1603, such as monitors, keyboards, pointing devices, etc., which can communicate with communication infrastructure 1606 through user input/output interface(s) 1602.

One or more processors 1604 can be a graphics processing unit (GPU). In an embodiment, a GPU can be a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 1600 can also include a main or primary memory 1608, such as random access memory (RAM). Main memory 1608 can include one or more levels of cache. Main memory 1608 can have stored therein control logic (i.e., computer software) and/or data.

Computer system 1600 can also include one or more secondary storage devices or memory 1610. Secondary memory 1610 can include, for example, a hard disk drive 1612 and/or a removable storage device or drive 1614. Removable storage drive 1614 can be a floppy disk drive, a magnetic tape drive, a compact disk drive, an optical storage device, tape backup device, and/or any other storage device/drive.

Removable storage drive 1614 can interact with a removable storage unit 1618. The removable storage unit 1618 can include a computer-usable or readable storage device having stored thereon computer software (control logic) and/or data. Removable storage unit 1618 can be a floppy disk, magnetic tape, compact disk, DVD, optical storage disk, and/any other computer data storage device. Removable storage drive 1614 can read from and/or write to the removable storage unit 1618.

Secondary memory 1610 can include other means, devices, components, instrumentalities, or other approaches for allowing computer programs and/or other instructions and/or data to be accessed by the computer system 1600. Such means, devices, components, instrumentalities, or other approaches can include, for example, a removable storage unit 1622 and an interface 1620. Examples of the removable storage unit 1622 and the interface 1620 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1600 can further include a communication or network interface 1624. Communication interface 1624 can enable computer system 1600 to communicate and interact with any combination of external devices, external networks, external entities, etc. (individually and collectively referenced by reference number 1628). For example, communication interface 1624 can allow computer system 1600 to communicate with external or remote devices 1628 over communications path 1626, which can be wired and/or wireless (or a combination thereof), and which can include any combination of WAN s, the Internet, etc. Control logic and/or data can be transmitted to and from the computer system 1600 via communication path 1626.

Computer system 1600 can also be any of a personal digital assistant (PDA), desktop workstation, laptop or notebook computer, netbook, tablet, smartphone, smartwatch or other wearable, appliance, part of the Internet-of-Things, and/or embedded system, to name a few non-limiting examples, or any combination thereof.

Computer system 1600 can be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc); and/or a hybrid model including any combination of the foregoing examples or other services or delivery paradigms.

Any applicable data structures, file formats, and schemas in computer system 1600 can be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, or schemas can be used, either exclusively or in combination with known or open standards.

In some embodiments, a tangible, non-transitory apparatus or article of manufacture including a tangible, non-transitory computer useable or readable medium having control logic (software) stored thereon can also be referred to herein as a computer program product or program storage device. This includes, but is not limited to, the computer system 1600, main memory 1608, secondary memory 1610, and removable storage units 1618 and 1622, as well as tangible articles of manufacture embodying any combination of the foregoing. Such control logic, when executed by one or more data processing devices (such as computer system 1600), can cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 16. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (Or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents.

What is claimed is:

1. A method, comprising:
  receiving, by a third-party component from a network component, a copy of a first data packet during a first period of time;
  extracting, by the third-party component, a first network parameter associated with the first period of time from the copy of the first data packet;
  predicting, by the third-party component, a baseline of normalcy for the first network parameter during a second period of time after the first period of time based on data associated with a copy of a second data packet and the first network parameter, the copy of the second data packet received during the second period of time;
  receiving, by the third-party component from the network component, a copy of a third data packet during the second period of time, the copy of the third data packet being different from the copy of the second data packet;
  extracting, by the third-party component, a second network parameter from the copy of the third data packet; and
  determining, by the third-party component, that the second network parameter of the copy of the second data packet is an anomaly based on the baseline of normalcy for the first network parameter.

2. The method of claim 1, wherein the first network parameter and the second network parameter are associated with one or more of a user device operation, a user device application usage, a user device location behavior, and a network-entity behavior pattern.

3. The method of claim 1, further comprising:
  deriving a network characteristic associated with the first period of time based on the copy of the first data packet and the copy of the second data packet.

4. The method of claim 3, wherein the network characteristic includes an amount of throughput, a direction of flow, a bandwidth utilization, a latency, or a utilized network service.

5. The method of claim 1, wherein the baseline of normalcy for the first network parameter is further based on a network provider input corresponding to a key performance indicator relating to the first network parameter.

6. The method of claim 1, wherein the second period of time includes a first point in time and a second point in time, and a baseline of normalcy for the first point in time is different than a baseline of normalcy for the second point in time.

7. The method of claim 1, further comprising:
  updating the baseline of normalcy for the first network parameter based on the anomaly.

8. The method of claim 1, wherein determining the second network parameter comprises determining that the second network parameter of the copy of the second data packet is the anomaly when determining that the anomaly exceeds the baseline of normalcy by a predetermined amount set by a network provider.

9. A system, comprising:
a memory; and
a processor coupled to the memory and configured to:
receive a copy of a first data packet during a first period of time;
extract a first network parameter associated with the first period of time from the copy of the first data packet;
predict a baseline of normalcy for the first network parameter during a second period of time after the first period of time based on data associated with a copy of a second data packet and the first network parameter, the copy of the second data packet received during the second period of time;
receive a copy of a third data packet during the second period of time, the copy of the third data packet being different from the copy of the second data packet;
extract a second network parameter from the copy of the third data packet; and
determine that the second network parameter of the copy of the second data packet is an anomaly based on the baseline of normalcy for the first network parameter.

10. The system of claim 9, wherein the first network parameter and the second network parameter are associated with one or more of a user device operation, a user device application usage, a user device location behavior, and a network-entity behavior pattern.

11. The system of claim 9, wherein the processor is further configured to derive a network characteristic associated with the first period of time based on the copy of the first data packet and the copy of the second data packet.

12. The system of claim 11, wherein the network characteristic includes an amount of throughput, a direction of flow, a bandwidth utilization, a latency, or a utilized network service.

13. The system of claim 9, wherein the baseline of normalcy for the first network parameter is further based on a network provider input corresponding to a key performance indicator relating to the first network parameter.

14. The system of claim 9, wherein the second period of time includes a first point in time and a second point in time, and a baseline of normalcy for the first point in time is different than a baseline of normalcy for the second point in time.

15. The system of claim 9, wherein the processor a third party component is further configured to update the baseline of normalcy for the first network parameter based on the anomaly.

16. A non-transitory computer-readable medium (CRM) having instructions stored thereon that, when executed by at least one computing device, cause the at least one computing device to perform operations comprising:
receiving, from a network component, a copy of a first data packet during a first period of time;
extracting a first network parameter associated with the first period of time from the copy of the first data packet;
predicting a baseline of normalcy for the first network parameter during a second period of time after the first period of time based on data associated with a copy of a second data packet and the first network parameter, the copy of the second data packet received during the second period of time;
receiving, from the network component, a copy of a third data packet during the second period of time, the copy of the third data packet being different from the copy of the second data packet;
extracting a second network parameter from the copy of the third data packet; and
determining that the second network parameter of the copy of the second data packet is an anomaly based on the baseline of normalcy for the first network parameter.

17. The non-transitory CRM of claim 16, wherein the first network parameter and the second network parameter are associated with one or more of a user device operation, a user device application usage, a user device location behavior, and a network-entity behavior pattern.

18. The non-transitory CRM of claim 16, wherein the operations further comprise deriving a network characteristic associated with the first period of time based on the copy of the first data packet and the copy of the second data packet.

19. The non-transitory CRM of claim 18, wherein the network characteristic includes an amount of throughput, a direction of flow, a bandwidth utilization, a latency, or a utilized network service.

20. The non-transitory CRM of claim 16, wherein the baseline of normalcy for the first network parameter is further based on a network provider input corresponding to a key performance indicator relating to the first network parameter.

* * * * *